(12) United States Patent
Arimura et al.

(10) Patent No.: US 9,964,914 B2
(45) Date of Patent: May 8, 2018

(54) ELECTROPHOTOGRAPHIC MEMBER, PROCESS CARTRIDGE, AND ELECTROPHOTOGRAPHIC APPARATUS

(71) Applicant: CANON KABUSHIKI KAISHA, Tokyo (JP)

(72) Inventors: Hideya Arimura, Suntou-gun (JP); Masaki Yamada, Mishima (JP); Sosuke Yamaguchi, Susono (JP); Kazuhiro Yamauchi, Suntou-gun (JP); Satoru Nishioka, Suntou-gun (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days. days.

(21) Appl. No.: 14/710,579

(22) Filed: May 12, 2015

(65) Prior Publication Data

US 2015/0331347 A1    Nov. 19, 2015

(30) Foreign Application Priority Data

May 16, 2014    (JP) ................................ 2014-102899

(51) Int. Cl.
*G03G 5/06*       (2006.01)
*G03G 15/02*      (2006.01)
(Continued)

(52) U.S. Cl.
CPC ........... *G03G 21/0017* (2013.01); *B32B 7/00* (2013.01); *B32B 7/12* (2013.01); *B32B 27/06* (2013.01);
(Continued)

(58) Field of Classification Search
None
See application file for complete search history.

(56) References Cited

U.S. PATENT DOCUMENTS

2011/0311865 A1* 12/2011 Tatsumi .................... C07F 9/02
                                                          429/199
2011/0311884 A1* 12/2011 Armand .................... B22F 9/24
                                                          429/336
(Continued)

FOREIGN PATENT DOCUMENTS

DE    202011106028    *  8/2012    ............. B01J 20/20
JP         57-5047 A         1/1982
(Continued)

OTHER PUBLICATIONS

Mohammad A. Khalilzadeh, et al., "HIO4/Al2O3 as a new system for iodination of activated aromatics and 1,3-dicarbonyl compounds", Tetrahedron Letters, vol. 47, 2006, pp. 3525-3528.

(Continued)

*Primary Examiner* — Joshua D Zimmerman
(74) *Attorney, Agent, or Firm* — Fitzpatrick Cella Harper and Scinto

(57) ABSTRACT

Provided is an electrophotographic member that has a high excessive charging-suppressing effect under a low-temperature and low-humidity environment, and has high charge-providing performance under a high-temperature and high-humidity environment, and a process cartridge and an electrophotographic apparatus each including the electrophotographic member. The electrophotographic member is an electrophotographic member including an electro-conductive substrate and an electro-conductive resin layer, the electro-conductive resin layer contains a cation and at least one anion selected from the group consisting of anions represented by the following formulae (1) to (5):

Structural formula (1)

(Continued)

-continued

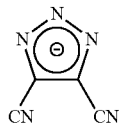

Structural formula (2)

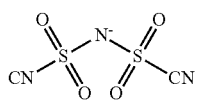

Structural formula (3)

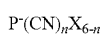

Structural formula (4)

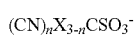

Structural formula (5)

where X represents an arbitrary halogen atom, n in the structural formula (4) represents an integer of from 2 to 6, and n in the structural formula (5) represents an integer of 2 or 3.

8 Claims, 3 Drawing Sheets

(51) Int. Cl.
G03G 21/00 (2006.01)
G03G 15/06 (2006.01)
G03G 15/08 (2006.01)
G03G 15/16 (2006.01)
B32B 7/00 (2006.01)
B32B 7/12 (2006.01)
B32B 27/06 (2006.01)
B32B 27/10 (2006.01)
B32B 29/00 (2006.01)

(52) U.S. Cl.
CPC .............. *B32B 27/10* (2013.01); *B32B 29/00* (2013.01); *G03G 15/02* (2013.01); *G03G 15/0233* (2013.01); *G03G 15/06* (2013.01); *G03G 15/0812* (2013.01); *G03G 15/0818* (2013.01); *G03G 15/1685* (2013.01); *B32B 2250/00* (2013.01); *B32B 2255/00* (2013.01); *B32B 2255/12* (2013.01); *B32B 2307/58* (2013.01); *B32B 2307/75* (2013.01); *B32B 2419/00* (2013.01); *B32B 2451/00* (2013.01); *B32B 2471/00* (2013.01); *B32B 2607/00* (2013.01); *B32B 2607/02* (2013.01)

(56) References Cited

U.S. PATENT DOCUMENTS

| | | | |
|---|---|---|---|
| 2013/0205654 A1* | 8/2013 | Peretolchin | C10L 1/232 44/345 |
| 2013/0236213 A1* | 9/2013 | Yamauchi | G03G 5/14708 399/159 |
| 2013/0252112 A1* | 9/2013 | Doe | H01M 10/054 429/328 |
| 2015/0093151 A1 | 4/2015 | Muranaka et al. | |
| 2015/0093310 A1* | 4/2015 | Bohringer | B01J 20/20 423/210 |
| 2015/0132024 A1 | 5/2015 | Watanabe et al. | |
| 2015/0198905 A1 | 7/2015 | Kikuchi et al. | |

FOREIGN PATENT DOCUMENTS

JP 2008251530 A * 10/2008
JP 2012-159807 A 8/2012

OTHER PUBLICATIONS

U.S. Appl. No. 14/709,155, filed May 11, 2015. Inventor: Satoru Nishioka, et al.
U.S. Appl. No. 14/708,940, filed May 11, 2015. Inventor: Masaki Yamada, et al.
U.S. Appl. No. 14/715,477, filed May 18, 2015. Inventor: Sosuke Yamaguchi, et al.
U.S. Appl. No. 14/709,013, filed May 11, 2015. Inventor: Kazuhiro Yamauchi et al.
U.S. Appl. No. 14/708,981, filed May 11, 2015. Inventor: Masaki Yamada, et al.
U.S. Appl. No. 14/715,033, filed May 18, 2015. Inventor: Sosuke Yamaguchi, et al.

* cited by examiner

ELECTROPHOTOGRAPHIC MEMBER, PROCESS CARTRIDGE, AND ELECTROPHOTOGRAPHIC APPARATUS

BACKGROUND OF THE INVENTION

Field of the Invention

The present invention relates to an electrophotographic member to be used in an electrophotographic apparatus, and to a process cartridge and an electrophotographic apparatus, including the electrophotographic member.

Description of the Related Art

An electrophotographic member is used for various applications such as a developer carrying member (e.g., a developing roller), a transferring roller, a charging member (e.g., a charging roller), a cleaning blade, and a developer layer thickness regulating member (e.g., a developing blade). It is preferred that such electrophotographic member have an electro-conductive property with an electric resistance value of about from $10^3$ Ω·cm to $10^{10}$ Ω·cm. In Japanese Patent Application Laid-Open No. 2012-159807, there is a disclosure of the invention of an electro-conductive roller to be used mainly in a developing device. Specifically, there is a disclosure of an electro-conductive roller including an elastic layer formed on an outer peripheral surface of a mandrel and a urethane coat layer formed on an outer peripheral surface of the elastic layer, in which the urethane coat layer contains a urethane resin, at least one kind selected from the group consisting of a pyridinium-based ionic liquid, an amine-based ionic liquid, and an ionic liquid having two hydroxyl groups in an amount of from 1 part by mass to 25 parts by mass with respect to 100 parts by mass of the urethane resin, and a carboxylic acid-based metal compound in an amount of from 1 part by mass to 25 parts by mass with respect to 100 parts by mass of the urethane resin.

There is also a disclosure that according to such electro-conductive roller, both a charge-removing function of the electro-conductive roller on a developer under a low-humidity environment and a charging function of the electro-conductive roller on a developer under a high-humidity environment, which have hitherto been considered to have a trade-off relationship, can be achieved in a balanced manner.

The inventors of the present invention investigated the use of the electro-conductive roller of Japanese Patent Application Laid-Open No. 2012-159807 as a developing roller and found the following. A suppressing effect on excessive charging of a developer may decrease under a low-temperature and low-humidity environment such as one having a temperature of 15° C. and a relative humidity of 10%. As a result, in the case where the electro-conductive roller is used as a developing roller for forming an electrophotographic image over a long period of time, the developer is excessively charged, and a toner regulation failure occurs in some cases. The toner regulation failure may cause, for example, an image defect called a ghost or image defects such as dot-like unevenness in a non-printed portion and a toner lump formed on an image.

On the other hand, in the case where the electro-conductive roller is used as a developing roller for forming an electrophotographic image over a long period of time under a high-temperature and high-humidity environment such as one having a temperature of 32.5° C. and a relative humidity of 85%, the charged amount of a developer may become insufficient. Therefore, when a white solid image formed of a non-printed portion to which the developer is not allowed to adhere is output, the white solid image may be colored with the developer.

SUMMARY OF THE INVENTION

The present invention is directed to providing an electrophotographic member that can suppress the accumulation of excessive charge on a developer under a low-temperature and low-humidity environment, and can stably provide the developer with charge under a high-temperature and high-humidity environment.

Further, the present invention is directed to providing a process cartridge and an electrophotographic apparatus that can each stably output a high-quality electrophotographic image by using the electrophotographic member according to the present invention.

The inventors of the present invention have made extensive investigations for achieving the objects. As a result, the inventors have found that an electrophotographic member including, as a surface layer, an electro-conductive layer containing an anion having a specific structure can achieve the objects well, and thus have completed the present invention.

According to one aspect of the present invention, there is provided an electrophotographic member, including: an electro-conductive substrate; and an electro-conductive resin layer, in which the electro-conductive resin layer contains a cation and at least one anion selected from the group consisting of anions represented by the structural formulae (1) to (5).

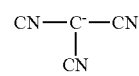

Structural formula (1)

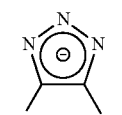

Structural formula (2)

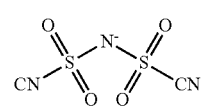

Structural formula (3)

Structural formula (4)

(In the structural formula (4), X represents an arbitrary halogen atom and n represents an integer of from 2 to 6.)

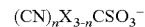

Structural formula (5)

(In the structural formula (5), X represents an arbitrary halogen atom and n represents an integer of 2 or 3.)

It should be noted that in the present invention, the electrophotographic member includes a developer carrying member (such as a developing roller), a transfer roller, a charging member (such as a charging roller), a cleaning blade, and a developer layer thickness regulating member (such as a developing blade).

According to another aspect of the present invention, there is provided a process cartridge, which is removably mounted onto an electrophotographic apparatus, the process cartridge including at least one of a charging member, a developer carrying member, and a developer layer thickness regulating member, in which at least one of the charging member, the developer carrying member, and the developer layer thickness regulating member includes the electrophotographic member.

According to further aspect of the present invention, there is provided an electrophotographic apparatus, including: an electrophotographic photosensitive member; and at least one of a charging member, a developer carrying member, and a developer layer thickness regulating member, in which at least one of the charging member, the developer carrying member, and the developer layer thickness regulating member includes the electrophotographic member.

According to the present invention, it is possible to provide the electrophotographic member that can suppress the accumulation of excessive charge on a developer under a low-temperature and low-humidity environment, and can stably provide the developer with charge under a high-temperature and high-humidity environment. In addition, according to the present invention, it is possible to provide the process cartridge and the electrophotographic apparatus that can each stably form a high-quality electrophotographic image.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

Figure 1A:
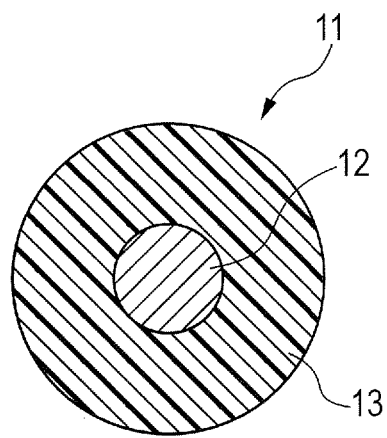
FIG. 1A is a conceptual view for illustrating an example of an electrophotographic member of the present invention.
Figure 1B:
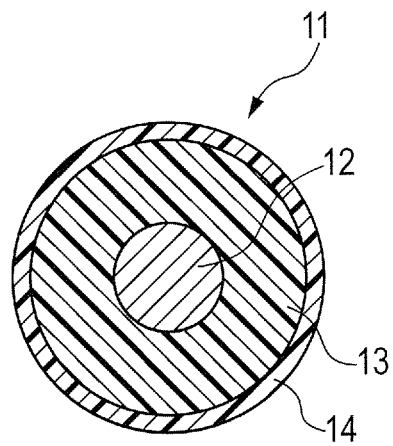
FIG. 1B is a conceptual view for illustrating another example of the electrophotographic member of the present invention.

Illustrated in each of FIG. 1A and FIG. 1B is an embodiment when an electrophotographic member according to the present invention is used as an electro-conductive roller. An electro-conductive roller 11 can be constructed so as to have, for example, an electro-conductive substrate 12 and an elastic layer 13 provided on the outer periphery of the substrate as illustrated in FIG. 1A. In this case, the elastic layer 13 is an electro-conductive resin layer according to the present invention and forms the outer surface of the electro-conductive roller 11, and the electro-conductive resin layer contains at least one cyano group-containing anion selected from the group consisting of anions represented by the following structural formulae (1) to (5) and a cation.

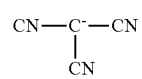

Structural formula (1)

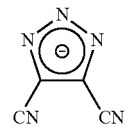

Structural formula (2)

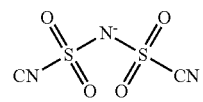

Structural formula (3)

Structural formula (4)

$P^-(CN)_nX_{6-n}$ (In the structural formula (4), X represents an arbitrary halogen atom and n represents an integer of from 2 to 6.)

Structural formula (5)

$(CN)_nX_{3-n}CSO_3^-$ (In the structural formula (5), X represents an arbitrary halogen atom and n represents an integer of 2 or 3.)

It should be noted that in the specification, the cyano group-containing anions represented by the structural formulae (1) to (5) are each sometimes simply referred to as "cyano group-containing anion."

The electro-conductive roller 11 according to the present invention may be such that an electro-conductive resin layer 14 that forms the outer surface of the electro-conductive roller 11 is formed on the outer periphery of the elastic layer 13 as illustrated in FIG. 1B.

It should be noted that the electro-conductive resin layer 14 can have a monolayer construction or a multilayer construction. In the case of the multilayer construction, at least the outermost layer of the electro-conductive resin layer 14 needs to be an electro-conductive resin layer having added thereto an ion conducting agent containing a cyano group-containing anion.

<Substrate>

The substrate 12 has a function as a solid or hollow electrode and support member for the electro-conductive roller 11 as the electrophotographic member. The substrate is formed of an electro-conductive material such as: a metal such as aluminum or copper, or an alloy such as stainless steel; iron subjected to a plating treatment with chromium or nickel; or a synthetic resin having electro-conductivity.

<Elastic Layer>
<Elastic Layer in Construction of FIG. 1A>

The elastic layer 13 is intended to impart, to the electro-conductive roller, elasticity needed for forming a nip having a predetermined width in a portion in which the electro-conductive roller and an electrophotographic photosensitive member (hereinafter referred to as "photosensitive member") abut with each other. As described above, when the electro-conductive roller has the construction illustrated in FIG. 1A, the elastic layer 13 forms the outermost layer and the elastic layer needs to be an electro-conductive elastic layer made of an electro-conductive resin containing a cyano group-containing anion (hereinafter sometimes referred to as "electro-conductive elastic layer"). A known resin material or rubber material can be used in the formation of the elastic layer. A binder for forming the elastic layer is not particularly limited, but examples thereof include a urethane resin, an epoxy resin, a urea resin, an ester resin, an amide resin, an imide resin, an amide-imide resin, a phenol resin, a vinyl resin, a silicone resin, and a fluorine resin. One kind of those materials can be used, or two or more kinds thereof can be used in combination.

Of those, a urethane resin is particularly preferred from the viewpoints of abrasion resistance and flexibility.

<Elastic Layer in Construction of FIG. 1B>

When the electro-conductive roller has the construction illustrated in FIG. 1B, a cyano group-containing anion is not an essential component in the elastic layer 13 and the layer is preferably formed of a molded body of a rubber material. Examples of the rubber material include an ethylene-propylene-diene copolymer rubber (EPDM), an acrylonitrile-butadiene rubber (NBR), a chloroprene rubber (CR), a natural rubber (NR), an isoprene rubber (IR), a styrene-butadiene rubber (SBR), a fluorine rubber, a silicone rubber, an epichlorohydrin rubber, a hydrogenated NBR, and a urethane rubber. One kind of those materials can be used, or two or more kinds thereof can be used in combination.

Those rubbers can be used alone or as a mixture of two or more kinds. Of those, a silicone rubber is particularly preferred from the viewpoints of compression set and flexibility. Examples of the silicone rubber include polydimethylsiloxane, polytrifluoropropylsiloxane, polymethylvinylsiloxane, polyphenylvinylsiloxane, and copolymers of those polysiloxanes.

Various additives such as a cyano group-containing anion or any other electro-conductivity-imparting agent, a nonconductive filler, a crosslinking agent, and a catalyst are appropriately compounded into the elastic layer 13 to the extent that an object of compounding any such additive is achieved and the effect of the present invention is not impaired.

As the electro-conductivity-imparting agent except the cyano group-containing anion, there can be used an ion conducting agent such as: carbon black; an electro-conductive metal such as aluminum or copper; a fine particle of an electro-conductive metal oxide such as zinc oxide, tin oxide, or titanium oxide; and a quaternary ammonium salt. Of those, carbon black is particularly preferred because of relatively easy availability and from the viewpoints of an electro-conductivity-providing property and a reinforcing property.

Examples of the nonconductive filler include silica, quartz powder, titanium oxide, zinc oxide, and calcium carbonate.

Examples of the crosslinking agent include, but not particularly limited to, tetraethoxysilane, di-t-butyl peroxide, 2,5-dimethyl-2,5-di(t-butylperoxy)hexane, and dicumyl peroxide.

<Electro-Conductive Resin Layer in Construction of FIG. 1B>

When the electro-conductive roller has the structure illustrated in FIG. 1B, a known resin can be used as a resin for forming the electro-conductive resin layer 14 and the resin for forming the layer is not particularly limited. Examples thereof include a urethane resin, an epoxy resin, a urea resin, an ester resin, an amide resin, an imide resin, an amide-imide resin, a phenol resin, a vinyl resin, a silicone resin, and a fluorine resin. One kind of those resins can be used, or two or more kinds thereof can be used in combination.

Of those, a urethane resin is particularly preferred from the viewpoints of abrasion resistance and flexibility.

Further, a filler, electro-conducting agent, softening agent, processing aid, tackifier, antitack agent, foaming agent, or the like that has been generally used as a compounding agent for a resin can be added to the electro-conductive resin layer to the extent that an object of compounding any such material is achieved and the effect of the present invention is not impaired.

The electro-conductive resin layer 14 illustrated in FIG. 1B forms the outermost layer and a cyano group-containing anion needs to be added to the layer. As in the elastic layer 13 described in the foregoing, various additives such as an electro-conductivity-imparting agent except the cyano group-containing anion, a nonconductive filler, a crosslinking agent, and a catalyst can be appropriately compounded into the electro-conductive resin layer 14 to the extent that an object of compounding any such additive is achieved and the effect of the present invention is not impaired. Those listed as additives for the elastic layer 13 in the foregoing can be utilized as specific examples of those additives.

A known molding method such as extrusion molding, injection molding, or compression molding, or a known coating method such as a spray coating method, a dipping method, a roll coating method, or a bar coating method can be employed in the formation of the electro-conductive resin layer. In addition, the placement of the electro-conductive resin layer on the outer peripheral surface of a mandrel can be performed by: a method involving forming a member serving as the electro-conductive resin layer in advance, and bonding and fixing the member to a predetermined position on the outer periphery of the mandrel; or a method involving forming the electro-conductive resin layer on the outer peripheral surface of the mandrel. It should be noted that even when the electrophotographic member is not of a roll shape but of, for example, a flat plate shape, the various methods can each be similarly utilized.

The electro-conductive resin layer (electro-conductive elastic layer) forming the outermost layer in the construction of FIG. 1A and the electro-conductive resin layer forming the outermost layer in the construction of FIG. 1B each contain a cyano group-containing anion.

<Cyano Group-containing Anion>

Examples of the cyano group-containing anion include a tricyanomethane anion (the structural formula (1)), a dicyanotriazolate anion (the structural formula (2)), a biscyanosulfonium imide anion (the structural formula (3)), a cyanophosphate anion (the structural formula (4)), and a cyanosulfonate anion (the structural formula (5)). At least one kind of those anions is used. Part of the cyano groups in the cyanophosphate anion or the cyanosulfonate anion may be substituted with a halogen atom (such as a fluorine atom, a chlorine atom, or a bromine atom). Of those, a tricyanomethane anion or a dicyanotriazolate anion is particularly preferred from the viewpoints of charge-providing performance and the suppression of excessive charging. The structures of those anions are shown below.

Structural formula (1)

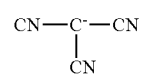

Structural formula (2)

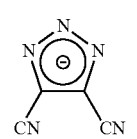

Structural formula (3)

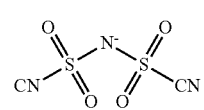

Structural formula (4)

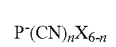

$P^-(CN)_n X_{6-n}$ (In the structural formula (4), X represents an arbitrary halogen atom and n represents an integer of from 2 to 6.)

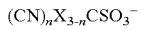  Structural formula (5)

(In the structural formula (5), X represents an arbitrary halogen atom and n represents an integer of 2 or 3.)

The following fact was an unexpected effect: when the electro-conductive resin layer contains at least one kind of the cyano group-containing anions, the electrophotographic member has high charge-providing performance under a high-temperature and high-humidity environment, and exhibits high excessive charging-suppressing performance even under a low-temperature and low-humidity environment. Details about the reasons for the foregoing are uncertain, but the inventors of the present invention have assumed the reasons to be as described below.

<Reason why Electrophotographic Member has High Charge-Providing Performance Even Under High-Temperature and High-Humidity Environment>

The cyano group-containing anion has, in a molecule thereof, a plurality of cyano groups having moderate electron-withdrawing properties. A cyano group has a high electron-withdrawing property but its degree is not as high as that of a halogen atom (such as a fluorine atom or a chlorine atom) as an extremely strong electron-withdrawing group, and hence the force by which a withdrawn electron is bound is not excessively large unlike the halogen atom. The inventors have assumed that as a result of the foregoing, a nitrogen atom having an unshared electron pair, the atom constituting the cyano group, can moderately emit an electron, and hence the electrophotographic member can exhibit charge-providing performance even under a high-temperature and high-humidity environment in which the charge-providing performance is liable to reduce. Further, the presence of the plurality of cyano groups may exhibit an improving effect on the charge-providing performance because an electron-emitting property improves as the number of cyano groups increases.

<Reason why Electrophotographic Member has High Excessive Charging-Suppressing Performance Even Under Low-Temperature and Low-Humidity Environment>

The cyano group-containing anion is chemically stable as compared to a halogen anion, a sulfate anion, and a nitrate anion, and hence the "ionization ratio" at which the anion is formed is high. The high ionization ratio is assumed to be derived from its chemical structure. As described above, such anion has, in a molecule thereof, a plurality of cyano groups as electron-withdrawing groups. An electron-withdrawing group has the following property: the group easily alleviates the localization of the negative charge of an anion (i.e., stabilizes the charge of the anion). Accordingly, the ionization ratio (electrolytic dissociation ratio) of the ion conducting agent may increase.

However, according to investigations made by the inventors of the present invention, in the case of a dicyanamide ion (anion having two cyano groups), when electrification was performed under a low-temperature and low-humidity environment for a long time period, sufficient electro-conductivity could not be obtained. The foregoing may result from the fact that the stabilization of the anion is insufficient. The inventors have assumed as follows: a sufficient stabilizing effect on the anion is not obtained and hence the ionization ratio does not increase, and in addition, the total amount of the ion conducting agent present as ions is small and hence the electro-conductivity of the electrophotographic member is reduced by the long-term electrification. In contrast, when additional stabilization by an electron-withdrawing group or a resonance structure is added to the stabilizing effect on the anion by the plurality of cyano groups like the present invention, the effect of the present invention may be exhibited. That is, the following anion-stabilizing effects can be additionally obtained in the cyano group-containing anions.

Structural formula (1): An additional stabilizing effect by three cyano groups
Structural formula (2): An additional stabilizing effect by a triazole ring
Structural formula (3): An additional stabilizing effect by the presence of a sulfonyl group
Structural formula (4): An additional stabilizing effect by a halogen atom having a high electronegativity
Structural formula (5): An additional stabilizing effect by a sulfonate group as a strong electron-withdrawing group The inventors have considered from the foregoing that the electrophotographic member expresses high electro-conductivity even under a low-temperature and low-humidity environment because the member shows a high ionization ratio over a wide temperature range. In addition, the inventors have assumed that the electrophotographic member expresses high conductivity even under the low-temperature and low-humidity environment, and hence can suppress charge from being excessively provided. In addition, as the ionization ratio increases, the ratio at which the ion conducting agent is present while dissociating into a cation and an anion increases, and hence the total amount of ions becomes large as compared to those of other ion conducting agents. The inventors have assumed that as a result of the foregoing, even when an image is printed on a large number of sheets under the low-temperature and low-humidity environment, the electrophotographic member expresses high electro-conductivity and hence can suppress charge from being excessively provided.

The cyano group-containing anion can be obtained by performing, for example, an ion exchange reaction between an alkali metal salt of a desired cyano group-containing anion and a salt containing a desired cation.

The cation in the electro-conductive resin layer may be incorporated as a counter ion to the cyano group-containing anion into the electro-conductive resin layer. In addition, the cation may be incorporated into the electro-conductive resin layer in a state of being bonded to a resin or rubber in the electro-conductive resin layer.

The cation species is not particularly limited as long as the species can act as a cation for obtaining a target effect by the cyano group-containing anion.

Examples of the cation can include a monovalent cation compound containing a cationic group in a molecule thereof, and monovalent cations of alkali metals such as lithium, sodium, and potassium. At least one kind selected from the group consisting of those cations can be used.

Specific examples of the monovalent cationic group contained in the molecule of the monovalent cation compound include a quaternary ammonium group, a sulfonium group, a phosphonium group, and a nitrogen-containing heterocyclic group.

Examples of the nitrogen-containing heterocyclic group include a piperidinium group, a pyrrolidinium group, a morpholinium group, an oxazolium group, a pyridinium group, a pyrimidinium group, a pyrazinium group, a pyridazinium group, an imidazolium group, a pyrazolium group, a triazolium group, hydrides thereof, and derivatives thereof.

More specific structure examples of the monovalent cationic group can include structures represented by the structural formulae (6) to (14) to be described later. It should be noted that the monovalent cationic group may be incorporated into the electro-conductive resin layer as a form of an electro-conductive elastic layer in a state of being bonded to a resin or rubber in the electro-conductive resin layer, e.g., a resin or rubber as a binder. Similarly, the monovalent cationic group may be incorporated into the electro-conductive resin layer as a form except the electro-conductive elastic layer in a state of being bonded to a resin in the electro-conductive resin layer, e.g., a resin as a binder. In this case, the rubber or resin having introduced thereto the monovalent cationic group corresponds to the cation according to the present invention.

In addition, as described above, a cation turned into the cation according to the present invention by chemically bonding the monovalent cationic group to the rubber or resin in the electro-conductive resin layer is preferably used as the cation to be used in combination with the cyano group-containing anion. The use of the cation obtained by chemically bonding the monovalent cationic group to the rubber or resin can additionally stabilize the charge quantity of a developer when the electro-conductive electrophotographic member according to the present invention is subjected as a developing member to long-term formation of an electrophotographic image.

That is, in the case of an electro-conductive resin layer having added thereto a general ion conducting agent (including a form of an electro-conductive elastic layer), the ion conducting agent may move in the layer owing to electrification. In addition, the electro-conductivity or charge-providing performance of the electro-conductive resin layer may change owing to such movement of the ion conducting agent in the layer. On the other hand, in the case of the cation obtained by chemically bonding the monovalent cationic group to the rubber or resin, even when an electrophotographic image is formed over a long time period, the movement of the cation in the electro-conductive resin layer can be suppressed.

Further, when the migration of the cation is suppressed, the cyano group-containing anion interacting with the cation also hardly migrates as compared to the case where the monovalent cationic group is not chemically bonded to the rubber or resin. That is, chronologically stable states of incorporation of the cyano group-containing anion and the cation in the electro-conductive resin layer can be maintained. It is assumed that as a result of the foregoing, the electro-conductivity of the electro-conductive resin layer stabilizes, and the charge quantity of the developer resulting from the ion conducting material on the outermost surface of the electro-conductive resin layer stabilizes.

Available as a method of chemically bonding the cation to the resin is, for example, a method involving introducing a reactive functional group to the cation and causing the group to react with a reactive functional group of a urethane resin or a melamine resin. Examples of the reactive functional group to be introduced to the cation include a hydroxyl group, an amino group, a glycidyl group, and a carboxyl group. At least one of those groups can be used in the bonding with the resin by being introduced to the cation.

Further, it is particularly preferred that a urethane resin be used as a binder resin and the cation be bonded to the urethane resin through a plurality of chemical bonds therebetween. In addition, the number of reactive functional groups to be introduced to the cation is particularly preferably set to two or more with respect to one molecule of the cation from the viewpoint of the stability of the charge quantity.

The content of the ion conducting agent is preferably 0.1 part by mass or more and 10 parts by mass or less with respect to 100 parts by mass of the binder resin in the electro-conductive resin layer from the viewpoints of electro-conductivity and the suppression of bleeding. In addition, the content is particularly preferably 1 part by mass or more and 5 parts by mass or less from the viewpoints of an excessive charging-suppressing effect under a low-temperature and low-humidity environment, and charge-providing performance under a high-temperature and high-humidity environment.

<Production of Electro-Conductive Resin Layer Containing Cyano Group-Containing Anion and Cation>

For example, the following methods can each be employed as a method of producing the electro-conductive elastic layer containing the cyano group-containing anion and the cation (including a form of an electro-conductive resin layer).

(I) A composition for forming the electro-conductive resin layer is prepared by mixing a rubber or resin for forming the electro-conductive resin layer with the cyano group-containing anion, the cation, and various additives to be used as required, and the electro-conductive resin layer is formed at a predetermined position on the outer periphery of an electro-conductive mandrel by using the composition.

(II) A resin is obtained by adding the cyano group-containing anion, the cation, and various additives to be used as required to a raw material component for the resin for forming the electro-conductive resin layer, and causing the raw material component to react therewith, and the electro-conductive resin layer is formed at the predetermined position on the outer periphery of the electro-conductive mandrel by using the resin.

In each of the methods (I) and (II), the monovalent cationic group can be chemically bonded to the rubber or the resin by introducing, to the compound having the monovalent cationic group, a reactive functional group for bonding with the rubber or the resin.

In addition, the reaction of the raw material component in the method (II) may be completed at the predetermined position on the outer periphery of the mandrel. The raw material component for the resin for forming the electro-conductive resin layer includes a monomer component (such as a low-molecular weight monomer, a high-molecular weight monomer, or a prepolymer), and a crosslinking agent or curing agent to be used as required. In the case of, for example, a urethane resin, a diisocyanate compound as a curing agent and a diol monomer can be used as the raw material components.

When unevenness needs to be formed on the surface of the electrophotographic member, a fine particle for roughness control may be added to the electro-conductive resin layer forming the outermost layer. The fine particle for roughness control is preferably fine particle having a volume-average particle diameter of from 3 μm to 20 μm. In addition, the addition amount of the fine particle to be added to the outermost layer is preferably from 1 part by mass to 50 parts by mass with respect to 100 parts by mass of the binder resin solid content of the outermost layer. Examples of a constituent material for the fine particle for roughness control can include a polyurethane resin, a polyester resin, a polyether resin, a polyamide resin, an acrylic resin, and a phenol resin. Fine particle made of different materials can also be used in combination.

A method of forming the electro-conductive resin layer is not particularly limited, but examples thereof include a spray method, a dipping method, and a roll coating method each involving using a paint. Of those, such dip coating method involving causing a paint to overflow from the upper end of a dipping tank as described in Japanese Patent Application Laid-Open No. S57-005047 is simple and excellent in production stability as a method of forming the resin layer.

The electrophotographic member of the present invention is applicable to any one of, for example, a noncontact-type developing apparatus and a contact-type developing apparatus each using a magnetic one-component developer or a nonmagnetic one-component developer, and a developing apparatus using a two-component developer.

A process cartridge and an electrophotographic apparatus to each of which the electrophotographic member according to the present invention is applicable are described below.

Figure 2:
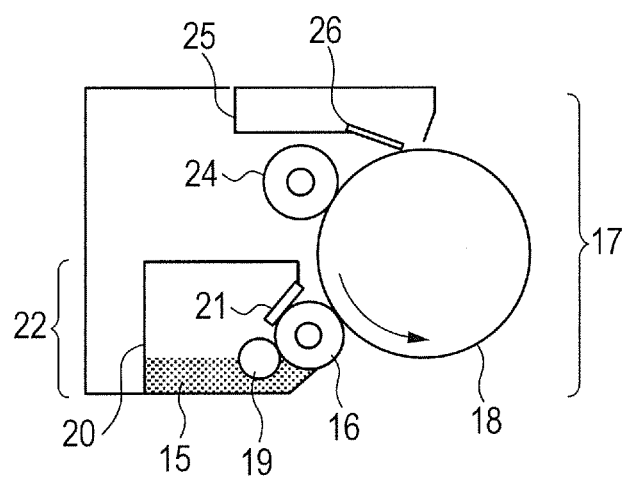
FIG. 2 is a conceptual construction view for illustrating an example of a process cartridge of the present invention.

The process cartridge includes at least one of a charging member, a developer carrying member, or a developer layer thickness regulating member. FIG. 2 is a sectional view for illustrating an example of the process cartridge. A process cartridge 17 illustrated in FIG. 2 includes a developing roller 16 (developer carrying member), a developing blade 21 (developer layer thickness regulating member), a developing apparatus 22, a photosensitive member configured to rotate in a counterclockwise direction (direction indicated by the arrow of FIG. 2), a cleaning blade 26, a waste toner-storing container 25, and a charging roller 24 (charging member). Those parts are integrated to form the process cartridge, which is removably mounted onto the main body of an electrophotographic image-forming apparatus. The developing apparatus 22 includes a toner container 20 and a toner 15 is loaded into the toner container 20. The toner 15 in the toner container 20 is supplied to the surface of the developing roller 16 by the toner-supplying roller 19, and a layer of the toner 15 having a predetermined thickness is formed on the surface of the developing roller 16 by the developing blade 21.

Figure 3:
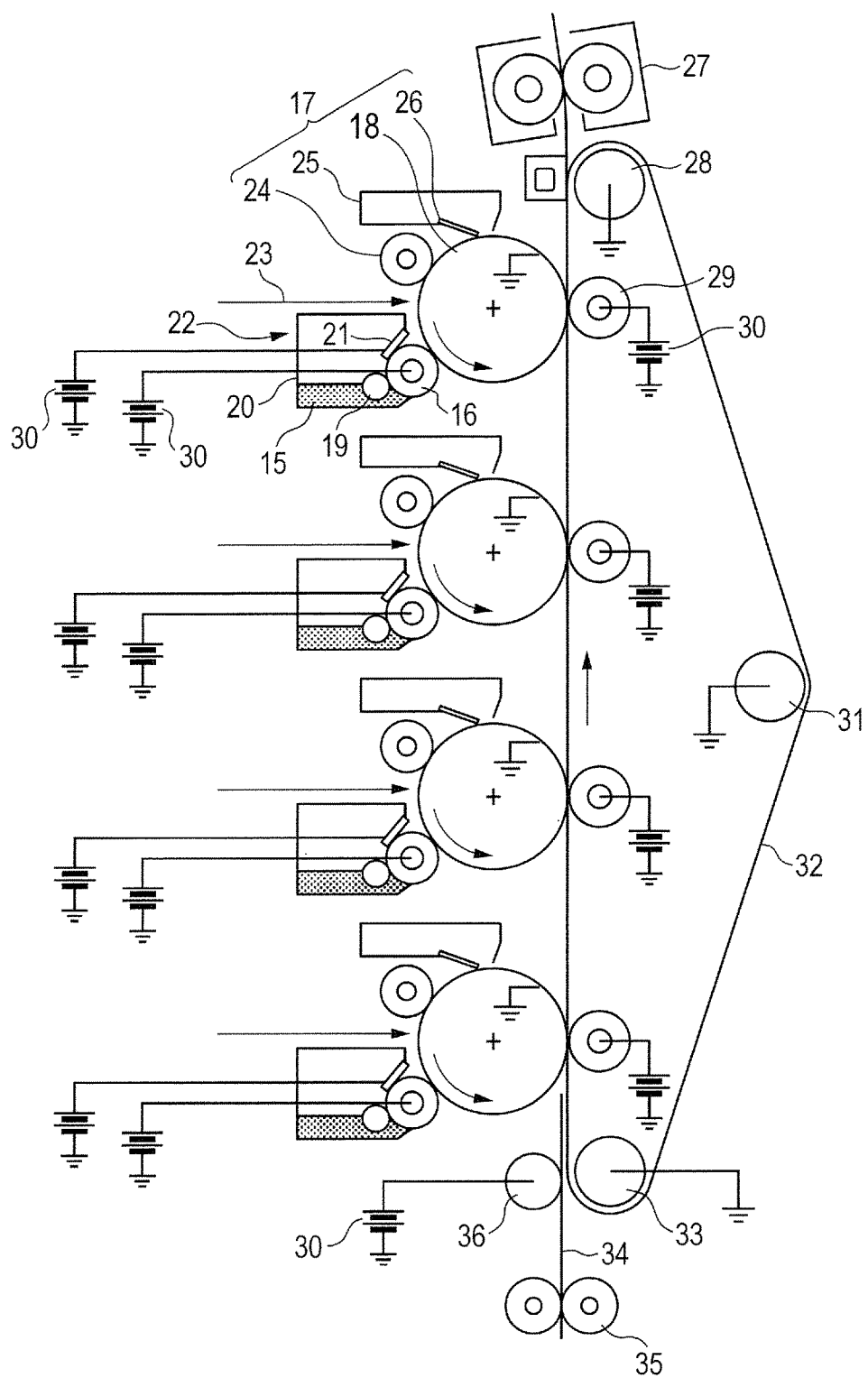
FIG. 3 is a conceptual construction view for illustrating an example of an electrophotographic apparatus of the present invention.

The electrophotographic apparatus includes a photosensitive member, and at least one of a charging member, a developer carrying member, or a developer layer thickness regulating member. FIG. 3 is a sectional view for illustrating an example of the electrophotographic apparatus. Removably mounted onto the electrophotographic apparatus of FIG. 3 is the developing apparatus 22 including the developing roller 16, the toner-supplying roller 19, the toner container 20, and the developing blade 21. Also removably mounted thereonto is the process cartridge 17 including the photosensitive member 18, the cleaning blade 26, the waste toner-storing container 25, and the charging roller 24. The developing apparatus 22 may be removably mounted alone, or the developing apparatus 22 may be integrally formed with the process cartridge 17 and removably mounted together with the cartridge. In addition, the developing apparatus 22, the photosensitive member 18, the cleaning blade 26, the waste toner-storing container 25, and the charging roller 24 may be disposed in the main body of the electrophotographic apparatus. That is, the process cartridge of the present invention may be any process cartridge as long as the process cartridge includes at least one of the charging member (such as the charging roller 24), the developer carrying member (such as the developing roller 16), or the developer layer thickness regulating member (such as the developing blade 21), and is removably mounted on the main body of the electrophotographic apparatus. At this time, at least one of the charging member, the developer carrying member, or the developer layer thickness regulating member is the electrophotographic member of the present invention.

The photosensitive member 18 is configured to rotate in a direction indicated by the arrow and is uniformly charged by the charging roller 24 for subjecting the photosensitive member 18 to a charging treatment, and an electrostatic latent image is formed on its surface by laser light 23 as an exposing unit for writing the electrostatic latent image on the photosensitive member 18. The toner 15 is applied to the electrostatic latent image by the developing apparatus 22 placed so as to be brought into contact with the photosensitive member 18 to develop the image, whereby the image is visualized as a toner image.

In the electrophotographic apparatus, the so-called reversal development in which the toner image is formed in an exposing portion is performed. The visualized toner image on the photosensitive member 18 is transferred onto paper 34 as a recording medium by a transfer roller 29 as a transfer member. The paper 34 is fed into the apparatus through a sheet-feeding roller 35 and an adsorption roller 36, and is conveyed into a gap between the photosensitive member 18 and the transfer roller 29 by an endless belt-shaped transfer conveyance belt 32. The transfer conveyance belt 32 is operated by a driven roller 33, a driving roller 28, and a tension roller 31. A voltage is applied from a bias power source 30 to each of the transfer roller 29 and the adsorption roller 36. The paper 34 onto which the toner image has been transferred is subjected to a fixing treatment by a fixing apparatus 27 and is discharged to the outside of the apparatus. Thus, a printing operation is completed.

Meanwhile, transfer residual toner remaining on the photosensitive member 18 without being transferred is scraped off by the cleaning blade 26 as a cleaning member for cleaning the surface of the photosensitive member and is stored in the waste toner-storing container 25, and the cleaned photosensitive member 18 repeatedly performs the above-mentioned action. The developing apparatus 22 includes: the toner container 20 storing the toner 15 as a one-component developer; the developing roller 16 as a developer carrying member, the roller being positioned in an opening portion extending in a lengthwise direction in the toner container 20 and being placed so as to face the photosensitive member 18; and the developing blade 21 as a developer layer thickness regulating member for regulating the amount of the toner 15 carried by the developing roller 16. The developing apparatus 22 is configured to develop and visualize the electrostatic latent image on the photosensitive member 18. It should be noted that a voltage is applied from the bias power source 30 to each of the developing roller 16 and the developing blade 21.

The electrophotographic member according to the present invention can be used in at least one kind of the electro-conductive roller such as the developing roller, the transfer roller, or the charging roller, developing blade, or cleaning blade of each of the process cartridge and the electrophotographic apparatus. Of those, at least one of the developing roller, the charging roller, or the developing blade is preferably the electrophotographic member according to the present invention. The developing roller in each of the process cartridge and the electrophotographic apparatus is particularly required to have electro-conductivity that is uniform and stable even when an environment in which the roller is used changes, and the electrophotographic member of the present invention is preferably used as such developing roller.

Examples and Comparative Examples according to the present invention are specifically described below.

(I) Preparation for Synthesis of Ion Conducting Agents I-1 to I-25 to be Used in Production of Electro-Conductive Members according to Examples and Comparative Examples;

An ion conducting agent containing a cyano group-containing anion can be synthesized by subjecting an ion conducting agent precursor and a salt having a desired anion to an ion exchange reaction.

Preparation of Ion Conducting Agent Precursors P1 to P9

Ion conducting agent precursors P1 to P9 shown in Table 1 below were prepared.

TABLE 1

| Ion conducting agent precursor | | Structure of cation |
|---|---|---|
| P-1 | 1,3-Bis(hydroxyethyl)-2-propylimidazolium chloride | Structural formula (6) |
| P-2 | 1-Hexyl-3-methylimidazolium chloride | Structural formula (7) |
| P-3 | Tris(hydroxyethyl)ethylammonium chloride | Structural formula (8) |
| P-4 | Tetrabutylammonium chloride | Structural formula (9) |
| P-5 | N-(2,3-Dihydroxypropyl)-2-hydroxyethylpyridinium chloride | Structural formula (10) |
| P-6 | Butylpyridinium chloride | Structural formula (11) |
| P-7 | N-(2,3-Dihydroxypropyl)pyridinium chloride | Structural formula (12) |
| P-8 | Tributylsulfonium iodide | Structural formula (13) |
| P-9 | Trihexyltetradecylphosphonium chloride | Structural formula (14) |

In addition, the chemical structural formulae of the cation portions of the ion conducting agent precursors P1 to P9 are shown below.

Structural formula (6)

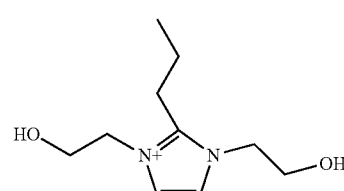

Structural formula (7)

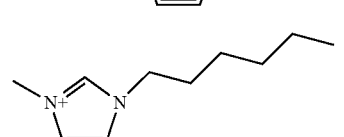

Structural formula (8)

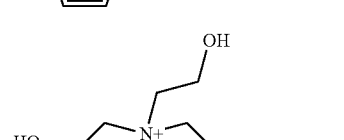

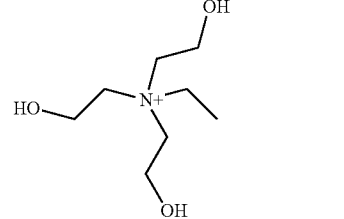

Structural formula (9)

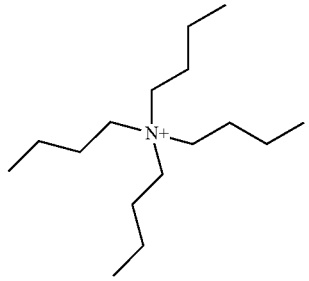

Structural formula (10)

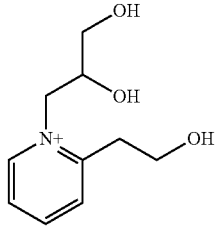

Structural formula (11)

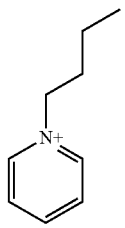

Structural formula (12)

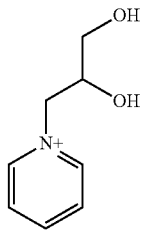

Structural formula (13)

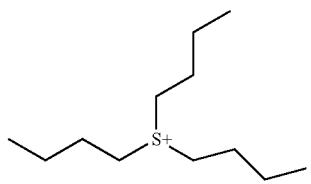

Structural formula (14)

$$H_3C(H_2C)_5-\underset{\underset{(CH_2)_5CH_3}{|}}{\overset{\overset{(CH_2)_5CH_3}{|}}{P^+}}-(CH_2)_{13}CH_3$$

It should be noted that commercial products were used as the ion conducting agent precursors P-2 (manufactured by Sigma-Aldrich), P-4 (manufactured by Tokyo Chemical Industry Co., Ltd.), P-6 (manufactured by Tokyo Chemical Industry Co., Ltd.), P-8 (manufactured by Tokyo Chemical Industry Co., Ltd.), and P-9 (manufactured by Sigma-Aldrich).

On the other hand, the ion conducting agent precursors P-1, P-3, P-5, and P-7 were synthesized by the following methods.

Synthesis of Ion Conducting Agent Precursor P-1

A stirrer and 50 ml of tetrahydrofuran (hereinafter abbreviated as "THF", manufactured by Kanto Chemical Co., Inc.) were loaded into a recovery flask mounted with a Dimroth condenser, and 55.0 g (2.3 mol) of sodium hydride (manufactured by Kanto Chemical Co., Inc.) was dispersed in THF, followed by the cooling of the recovery flask in an ice bath. A solution prepared by dissolving 50.0 g (0.46 mol) of N-1 (2-propylimidazole, manufactured by Tokyo Chemical Industry Co., Ltd.) as a nucleophile in 200 ml of THF was slowly dropped to the mixture. After that, the ice bath was removed and the resultant mixture was stirred at room temperature for 2 hours. 123.0 Grams (1.4 mmol) of 2-chloroethanol (manufactured by Sigma-Aldrich) as an electrophile was added to the mixture at room temperature, and then the whole was heated to reflux at 70° C. for 7 hours. The reaction liquid after the reaction was filtered, insoluble matter was washed away with THF, and the solvent of the resultant filtrate was evaporated under reduced pressure. The resultant concentrate was dissolved in dichloromethane again, the solution was filtered, and the filtrate was recovered. After that, the solvent was evaporated under reduced pressure. The resultant concentrate was washed with diethyl ether and dried under reduced pressure to provide 95.0 g of the ion conducting agent precursor P-1.

Synthesis of Ion Conducting Agent Precursor P-3

40.0 Grams (0.33 mol) of N-ethyldiethanolamine (manufactured by Tokyo Chemical Industry Co., Ltd.) was dissolved in 200 ml of acetonitrile, and 59.5 g (0.66 mol) of an electrophile 2-chloroethanol (manufactured by Sigma-Aldrich) for quaternization was added to the solution at room temperature. After that, the mixture was heated to reflux at 90° C. for 72 hours and then the solvent was evaporated under reduced pressure. The resultant concentrate was washed with diethyl ether and the supernatant was removed by decantation. The washing and the decantation were repeated three times. Thus, a residue was obtained. The resultant residue was dried to provide 65.0 g of the ion conducting agent precursor P-3.

Synthesis of Ion Conducting Agent Precursor P-5

40.0 Grams (0.25 mol) of 2-hydroxyethylpyridine (manufactured by Tokyo Chemical Industry Co., Ltd.) was dissolved in 20 ml of acetonitrile, and 41.8 g (0.38 mol) of an electrophile 3-chloro-1,2-propanediol dissolved in 10 ml of acetonitrile was added to the solution at room temperature. After that, the mixture was heated to reflux at 90° C. for 72 hours and then the solvent was evaporated under reduced pressure. The resultant concentrate was washed with diethyl ether and the supernatant was removed by decantation. The washing and the decantation were repeated three times. Thus, a residue was obtained. The resultant residue was dried to provide 57.0 g of the ion conducting agent precursor P-5.

Synthesis of Ion Conducting Agent Precursor P-7

The ion conducting agent precursor P-7 was synthesized in the same manner as in the ion conducting agent precursor P-except that the nucleophile for synthesizing an ion conducting agent precursor was changed to 19.8 g (0.25 mol) of pyridine (manufactured by Tokyo Chemical Industry Co., Ltd.).

(II) Preparation of Anionic Salts to be Used in Production of Ion Conducting Agents I-1 to I-25;

Anionic salts A-1 to A-6 shown in Table 2 below were prepared.

TABLE 2

| No. | Name of compound | Structure of anion |
|---|---|---|
| A-1 | Potassium tricyanomethanide (manufactured by Strem Chemicals, Inc.), | Structural formula (1) |
| A-2 | Sodium 4,5-dicyanotriazolate | Structural formula (2) |
| A-3 | Sodium 1,1-dicyano-1-iodomethanesulfonate | Structural formula (15) |
| A-4 | Lithium tetrafluoroborate (manufactured by Wako Pure Chemical Industries, Ltd.) | Structural formula (16) |
| A-5 | Sodium perchlorate (manufactured by Kishida Chemical Co., Ltd.) | Structural formula (17) |
| A-6 | Sodium dicyanamide (manufactured by Tokyo Chemical Industry Co., Ltd.) | Structural formula (18) |

The chemical structural formulae of the anion portions of the anionic salts A-1 to A-6 are shown below.

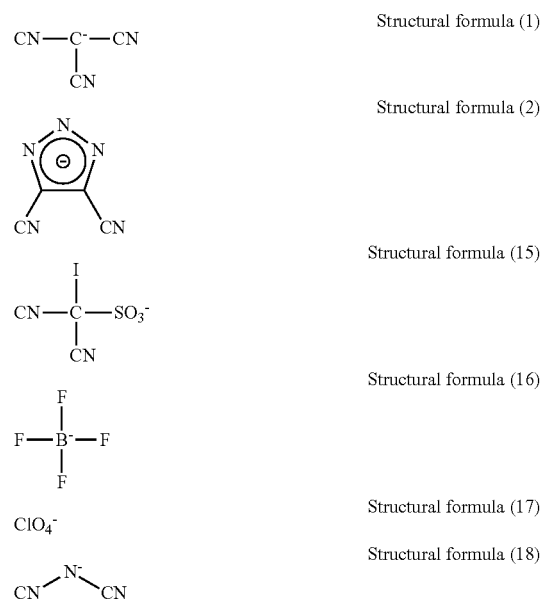

Commercial products were used as the anionic salts A-1 (manufactured by Strem Chemicals, Inc.), A-4 (manufactured by Wako Pure Chemical Industries, Ltd.), A-5 (manufactured by Kishida Chemical Co., Ltd.), and A-6 (manufactured by Tokyo Chemical Industry Co., Ltd.).

On the other hand, the anionic salts A-2 and A-3 were synthesized by the following methods.

Synthesis of Anionic Salt A-2

108.0 Grams (1.0 mol) of diaminomaleonitrile (manufactured by Tokyo Chemical Industry Co., Ltd.), 49.0 g of sulfuric acid, and 200.0 g of ion-exchanged water were loaded into a flask mounted with a temperature gauge, a nitrogen gas-introducing tube, a reflux condenser, a stirring device, and a dropping funnel. While the temperature of the mixture was kept at 0° C. in a stream of nitrogen, 69.0 g (1.0 mol) of sodium nitrite and 200.0 g of water were dropped to the mixture over 1 hour, and the temperature of the whole was further kept at 25° C. for 1 hour. Thus, the reaction was completed. Next, an extraction step was performed by using diethyl ether and ion-exchanged water. Thus, a brown solid was obtained. The resultant solid was sublimated at 80° C. and 30 Pa to provide 75.0 g of 4,5-dicyanotriazole as a white product. Next, 59.0 g (0.5 mol) of 4,5-dicyanotriazole was dissolved in 250 g of ion-exchanged water. 20 Grams of a 30 wt % aqueous solution of sodium hydroxide was added to the solution while the solution was cooled, and water was evaporated. Thus, 70.5 g of the anionic salt A-2 (sodium dicyanotriazolate) was obtained.

Synthesis of Anionic Salt A-3

(1) Synthesis of Diethyl 2,2-Diiodomalonate

Diethyl 2,2-diiodomalonate was synthesized according to a known synthesis method (for example, Mahmoud Tajbakhsh et al., "$HIO_4/Al_2O_3$ as a new system for iodination of activated aromatics and 1,3-dicarbonyl compounds", Tetrahedron Letters, the United Kingdom, May 22, 2006, vol. 47, no. 21, pages 3525 to 3528).

(2) Synthesis of 2,2-Diiodomalonamide

300 Grams of diethyl 2,2-diiodomalonate synthesized in the foregoing was loaded into a 500-mL flask, and 120 mL of diethyl ether was added to dissolve diethyl 2,2-diiodomalonate. While the solution was cooled with ice, 99.9 g of a 28% aqueous solution of ammonia was added to the solution. After the solution had been stirred at room temperature for 3 hours, extraction was performed by adding 200 ml of diethyl ether and 100 ml of water, followed by the recovery of a diethyl ether layer. The following operation was repeated twice: extraction was performed by adding 50 ml of diethyl ether to the remaining aqueous layer, and a diethyl ether layer was recovered. The diethyl ether layers obtained by the two operations and the initially recovered diethyl ether layer were combined, and the solvent was evaporated. 50 Milliliters of hexane was added to the residue, and the mixture was filtered with a membrane filter having a pore diameter of 0.45 μm (manufactured by Merck Millipore) under reduced pressure. The residue was recovered and vacuum-dried at 50° C. for 3 hours to provide 180 g of 2,2-diiodomalonamide.

(3) Synthesis of Sodium 1,3-Diamino-2-iodo-1,3-dioxopropane-2-sulfinate

Under an argon atmosphere, 170 g of 2,2-diiodomalonamide obtained in the section (2) was loaded into a 500-mL flask, and 300 ml of acetonitrile was added to dissolve 2,2-diiodomalonamide. 40.3 Grams of sodium hydrogen carbonate, 62.7 g of sodium dithionite, and 300 ml of pure water were added to the solution in the stated order. The mixture was stirred at room temperature for 2 hours, and was then filtered and concentrated. 100 Milliliters of methanol was added to the resultant, and the mixture was filtered. The filtrate was concentrated and vacuum-dried at 60° C. for 3 hours to provide 120 g of sodium 1,3-diamino-2-iodo-1,3-dioxopropane-2-sulfinate.

(4) Synthesis of Sodium 1,3-Diamino-2-iodo-1,3-dioxopropane-2-sulfonate

110 Grams of sodium 1,3-diamino-2-iodo-1,3-dioxopropane-2-sulfinate obtained in the section (3) was loaded into a 2-L flask, and 1 L of water was added to dissolve sodium 1,3-diamino-2-iodo-1,3-dioxopropane-2-sulfinate. 79 Milliliters of 30% hydrogen peroxide and 256 mg of sodium tungstate dihydrate were sequentially added to the aqueous solution, and the mixture was stirred at room temperature for 2 hours. After that, manganese oxide was added to the mixture until no bubbles were formed, followed by stirring at room temperature for 30 minutes. Next, the resultant aqueous solution was filtered, and the filtrate was concentrated and vacuum-dried at 60° C. for 3 hours to provide 109 g of sodium 1,3-diamino-2-iodo-1,3-dioxopropane-2-sulfonate.

(5) Synthesis of Sodium 1,1-Dicyano-1-iodomethanesulfonate

Under an argon atmosphere, 80 g of sodium 1,3-diamino-2-iodo-1,3-dioxopropane-2-sulfonate obtained in the section (4) was loaded into a 200-ml flask, and 110 ml of dry dimethylformamide was added to dissolve sodium 1,3-diamino-2-iodo-1,3-dioxopropane-2-sulfonate. Next, 40.0 ml of trifluoroacetic anhydride was added to the solution so that a temperature in the flask did not exceed 5° C., and the mixture was stirred under ice cooling for 30 minutes. After that, the mixture was heated to 80° C., and the solvent and a by-product were evaporated under reduced pressure. The resultant residue was vacuum-dried at 80° C. for 2 hours and then left standing to cool to room temperature. The resultant was dissolved in 30 ml of dry acetonitrile and recrystallization was performed by adding 60 ml of dichloromethane. The crystals were filtered with a membrane filter having a pore diameter of 0.45 μm (manufactured by Merck Millipore) under reduced pressure, and the residue was recovered. Next, the residue was dissolved in 100 ml of acetonitrile, and the solution was filtered with a membrane filter having a pore diameter of 0.45 μm (manufactured by Merck Millipore) under reduced pressure. The filtrate was concentrated and then vacuum-dried at 60° C. for 3 hours to provide 53 g of the anionic salt A-3 (sodium 1,1-dicyano-1-iodomethanesulfonate).

Production of Ion Conducting Agents I-1 to I-25

Synthesis of Ion Conducting Agent I-1

10.0 Grams (43 mmol) of the ion conducting agent precursor P-1 was dissolved in 50 ml of dichloromethane. An aqueous solution prepared by dissolving 8.3 g (64 mmol) of the anionic salt A-1 (potassium tricyanomethanide, manufactured by Strem Chemicals, Inc.) as an anion precursor was added to the solution, and the mixture was stirred for 24 hours. The resultant solution was subjected to liquid separation to provide an organic layer. The organic layer was subjected to liquid separation with water twice, and then dichloromethane was evaporated under reduced pressure. Thus, an ion conducting agent I-1 whose anion was a tricyanomethanide ion was obtained.

Synthesis of Ion Conducting Agents I-2 to I-12 and I-22 to I-26

Ion conducting agents I-2 to I-12 and I-22 to I-25 were each synthesized in the same manner as in the ion conducting agent I-1 except that the kinds and compounding amounts of the ion conducting agent precursor and anionic salt to be used in the synthesis were changed as shown in Table 3.

TABLE 3

| Ion conducting agent No. | Ion conducting agent precursor No. | (g) | Anionic salt No. | (g) |
|---|---|---|---|---|
| I-1 | P-1 | 10.0 | A-1 | 8.3 |
| I-2 | P-2 | 10.0 | A-1 | 9.6 |
| I-3 | P-3 | 10.0 | A-1 | 9.1 |
| I-4 | P-4 | 10.0 | A-1 | 7.0 |
| I-5 | P-5 | 10.0 | A-1 | 8.3 |
| I-6 | P-6 | 10.0 | A-1 | 11.3 |
| I-7 | P-1 | 10.0 | A-2 | 9.0 |
| I-8 | P-2 | 10.0 | A-2 | 10.5 |
| I-9 | P-3 | 10.0 | A-2 | 9.9 |
| I-10 | P-4 | 10.0 | A-2 | 7.6 |
| I-11 | P-7 | 10.0 | A-2 | 11.2 |
| I-12 | P-8 | 10.0 | A-2 | 9.0 |
| I-22 | P-1 | 10.0 | A-3 | 18.8 |
| I-23 | P-3 | 10.0 | A-3 | 20.7 |
| I-24 | P-1 | 10.0 | A-4 | 6.6 |
| I-25 | P-4 | 10.0 | A-5 | 6.6 |

Synthesis of Ion Conducting Agent I-13

(1) Synthesis of Bis(chlorosulfonyl)imide 50.0 Grams (0.51 mol) of sulfamic acid, 60.0 g (0.51 mol) of chlorosulfonic acid, and 147.0 g (1.2 mol) of thionyl chloride were mixed under an inert atmosphere, and the mixture was heated to reflux at 130° C. After the production of sulfur dioxide as a by-product had stopped, a calcium chloride tube was attached to the steam discharge port of a reaction system so that moisture was not mixed in the reaction system, and the reaction system was cooled. After that, excess thionyl chloride was evaporated under reduced pressure. Thus, 76.0 g of bis(chlorosulfonyl)imide was obtained.

(2) Synthesis of Ion Conducting Agent I-13

30.0 Grams (0.15 mol) of the ion conducting agent precursor P-2 and 300 ml of dichloromethane were stirred in a flask, and 31.0 g (0.15 mol) of bis(chlorosulfonyl)imide synthesized in the section (1) and 252.5 g (1.5 mol) of silver nitrate were added to the mixture, followed by stirring for 15 minutes. After that, 86.9 g (1.3 mol) of potassium cyanide was added to the resultant, and the mixture was refluxed at 50° C. The reaction liquid was concentrated by vacuum drawing, and potassium bromide and silver nitrate were removed by filtering the resultant concentrated liquid. After that, the residue was vacuum-dried at 80° C. to provide 39.0 g of an ion conducting agent I-13 (1-hexyl-3-methylimidazolium bis(cyanosulfonyl)imide).

The structure of the anion of the resultant ion conducting agent is shown below.

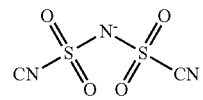

Structural formula (3)

Synthesis of Ion Conducting Agents I-14 to I-16

Ion conducting agents I-14 to I-16 were each synthesized in the same manner as in the ion conducting agent I-13 except that the kind and compounding amount of the ion conducting agent precursor, and the compounding amounts of the other raw materials were changed as shown in Table 4.

TABLE 4

| Ion conducting agent No. | Ion conducting agent precursor No. | (g) | Bis(chlorosulfonyl) imide (g) | Silver nitrate (g) | Potassium cyanide (g) | Structure of anion |
|---|---|---|---|---|---|---|
| I-13 | P-2 | 30.0 | 31 | 252.5 | 86.9 | Structural formula (3) |
| I-14 | P-3 | 30.0 | 30 | 239.4 | 82.4 | Structural formula (3) |
| I-15 | P-5 | 30.0 | 27 | 218.9 | 75.3 | Structural formula (3) |
| I-16 | P-9 | 30.0 | 12 | 98.5 | 33.9 | Structural formula (3) |

Synthesis of Ion Conducting Agent I-17

A 50-ml flask mounted with a stirring device, a dropping funnel, and a Dimroth condenser was prepared. Air in the flask was replaced with nitrogen, and 20.0 g (85 mmol) of the ion conducting agent precursor P-1, 80.0 g (68 mmol) of zinc(II) cyanide, 100 ml of toluene, and 12.4 g (60 mmol) of phosphorus pentachloride were loaded into the flask at room temperature. After that, the contents were stirred for 2 days while being heated in an oil bath at 130° C. After the 2 days of stirring, toluene in the flask was evaporated under reduced pressure. Thus, a black solid was obtained. The resultant solid was pulverized with a mortar and then loaded into a beaker mounted with a stirring device. 200 Milliliters of chloroform was added to the beaker twice to extract the product in a chloroform layer. Next, the resultant chloroform solution was transferred to a separating funnel and washed with 200 ml of water. After that, an organic layer was separated and concentrated with an evaporator to provide an oily crude product. The oily crude product was purified by column chromatography using neutral alumina as a filler (developing solvent: a mixed solvent of diethyl ether and chloroform). A fraction containing a product was fractionated, and the solvent was evaporated to dryness. Thus, 13.0 g of an ion conducting agent I-17 (1,3-bis(hydroxyethyl)-2-propylimidazolium hexacyanophosphate) as the product was obtained.

The structure of the anion of the resultant ion conducting agent is shown below.

Structural formula (19)

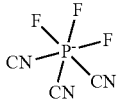

Structural formula (20)

Synthesis of Ion Conducting Agents I-18 and I-19

Ion conducting agents I-18 and I-19 were each synthesized in the same manner as in the ion conducting agent I-17 except that the kind and compounding amount of the ion conducting agent precursor, and the compounding amounts of the other raw materials were changed as shown in Table 5.

TABLE 5

| Ion conducting agent No. | Ion conducting agent precursor No. | (g) | Zinc cyanide (g) | Phosphorus pentachloride (g) | Structure of anion |
|---|---|---|---|---|---|
| I-17 | P-1 | 20.0 | 80.0 | 12.4 | Structural formula (19) |
| I-18 | P-4 | 20.0 | 67.6 | 10.5 | Structural formula (19) |
| I-19 | P-7 | 20.0 | 99.0 | 15.4 | Structural formula (19) |

Synthesis of Ion Conducting Agent I-20

In a stream of argon, 50.0 g (0.24 mol) of phosphorus pentachloride, 140 mL of dry acetonitrile, and 10.0 g (0.24 mol) of lithium chloride were loaded into a 300-mL round-bottom flask, and the mixture was stirred for 1 hour. The resultant solution was loaded into a 500-mL two-necked round-bottom flask containing 96.0 g (0.71 mol) of silver cyanide and 150 mL of dry acetonitrile, and the mixture was stirred for 1 day. After that, the mixture was filtered and the filtrate was concentrated. 100 Milliliters of dichloromethane was added to the concentrated liquid, and the mixture was washed with 50 mL of water three times. After that, a dichloromethane layer was fractionated and concentrated to provide 21.0 g of lithium trichlorotricyanophosphate.

Next, in a stream of argon, 20.0 g (90 mmol) of lithium trichlorotricyanophosphate produced in the foregoing and 70 mL of dry acetonitrile were loaded into a 500-mL flask, and lithium trichlorotricyanophosphate was dissolved in dry acetonitrile. The solution was loaded into a 1-L flask containing 106.0 g (0.54 mol) of $AgBF_4$ and 500 mL of dry acetonitrile, and the mixture was stirred for 4 days. After that, the reaction liquid was filtered and the filtrate was concentrated. The concentrated liquid was dissolved in 200 mL of dichloromethane, and the solution was washed with 100 mL of water four times. A dichloromethane layer was extracted and then vacuum-dried to provide 7.6 g of an ion conducting agent I-20 (lithium trifluorotricyanophosphate). The structure of the anion of the resultant ion conducting agent is shown below.

Synthesis of Ion Conducting Agent I-21

In a stream of argon, 20.0 g (97 mmol) of phosphorus pentachloride, 140 mL of dry acetonitrile, and 50 g (97 mmol) of trihexyltetradecylphosphonium chloride were loaded into a 300-mL round-bottom flask, and the mixture was stirred for 1 hour. The resultant solution was loaded into a 500-mL two-necked round-bottom flask containing 39.0 g (0.29 mol) of silver cyanide and 150 mL of dry acetonitrile, and the mixture was stirred for 1 day. After that, the mixture was filtered and the filtrate was concentrated. 100 Milliliters of dichloromethane was added to the concentrated liquid, and the mixture was washed with 50 mL of water three times. After that, a dichloromethane layer was fractionated and concentrated to provide 27.0 g of an ion conducting agent I-21 (trihexyltetradecylphosphonium trichlorotricyanophosphate).

The structure of the anion of the resultant ion conducting agent is shown below.

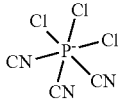

Structural formula (21)

Example 1

The electrophotographic member of the present invention is hereinafter described more specifically by way of Examples.

Preparation of Substrate 12

A primer (trade name: DY35-051; manufactured by Dow Corning Toray Co., Ltd.) was applied to a cored bar made of SUS304 having a diameter of 6 mm, and was baked in an oven heated to a temperature of 180° C. for 20 minutes. Thus, the substrate 12 as a mandrel was obtained.

Preparation of Elastic Roller D-1

A liquid silicone rubber material and carbon black shown in Table 6 were mixed, and the carbon black was dispersed in the liquid silicone rubber material. Thus, a liquid material for forming an elastic layer was prepared. The substrate 12 prepared in advance was placed in a mold, the liquid material was loaded into a cavity formed in the mold, and the resultant was heated in an oven heated to a temperature of 140° C. for 20 minutes to be cured. After the mold had been cooled, the mandrel having formed thereon a silicone rubber layer was removed from the mold, and the curing reaction of the silicone rubber layer was completed by heating the mandrel in an oven heated to a temperature of 190° C. for 3 hours. Thus, an elastic roller D-1 having a silicone rubber elastic layer having a diameter of 12 mm formed on the outer periphery of the substrate 12 was produced.

TABLE 6

| | |
|---|---|
| Liquid silicone rubber material (trade name: SE6905A/B; manufactured by Dow Corning Toray Co., Ltd.) | 100 parts by mass |
| Carbon black (trade name: TOKABLACK #4300; manufactured by Tokai Carbon Co., Ltd.) | 15 parts by mass |

(Formation of Electro-conductive Resin Layer)

(Synthesis of Polyether Polyol B-1)

In a reaction vessel, the temperature of a mixture of 216.3 g (3 mol) of dry tetrahydrofuran and 172.2 g (2 mol) of dry 3-methyltetrahydrofuran (molar mixing ratio: 60/40) was held at 15° C. 16.4 Grams of 70% perchloric acid and 120 g of acetic anhydride were added to the mixture, and the whole was subjected to a reaction for 2 hours. Next, the reaction mixture was poured into 600 g of a 20% aqueous solution of sodium hydroxide to be purified. Further, the remaining water and the remaining solvent component were removed under reduced pressure. Thus, a polyether polyol B-1 was obtained. The polyether polyol had a number-average molecular weight of 1,200.

Next, the following respective components as materials for forming the electro-conductive resin layer 14 were stirred and mixed to prepare a mixture.

Polyether polyol B-1 75.5 parts by mass

Polymeric isocyanate (trade name: Millionate MR-200; manufactured by Tosoh Corporation (formerly: Nippon Polyurethane Industry Co., Ltd.)) 24.5 parts by mass Ion conducting agent I-1 2.0 parts by mass Silica (trade name: AEROSIL 200; manufactured by Nippon Aerosil Co., Ltd.) 10.0 parts by mass Urethane resin fine particle (trade name: Art-pearl C-800; manufactured by Negami Chemical Industrial Co., Ltd.) 10.0 parts by mass Next, methyl ethyl ketone was added to the resultant mixture so that a total solid content ratio became 30 mass %. After that, the contents were mixed with a sand mill, and an appropriate amount of methyl ethyl ketone was further added to adjust the viscosity of the mixture to from 10 cps to 12 cps. Thus, a paint for forming a surface layer was obtained.

A coating film of the paint for forming a surface layer was formed on the surface of the elastic layer of the elastic roller D-1 by immersing the elastic roller D-1 in the paint, and was dried. A surface layer having a thickness of 15 μm was formed on the outer periphery of the elastic layer by further subjecting the coating film to a heat treatment at a temperature of 150° C. for 1 hour. Thus, an electro-conductive roller according to Example 1 was produced. It should be noted that the surface layer is the electro-conductive resin layer.

It should be noted that the ion conducting agent I-1 according to this example is synthesized by using the ion conducting agent precursor P-1 and the anionic salt A-1 as shown in Table 3 above. In addition, the ion conducting agent precursor P-1 has a cationic group having two hydroxyl groups represented by the structural formula (6) as shown in Table 1 above. Therefore, a cation in the electro-conductive resin layer according to Example 1 is a urethane resin having a monovalent cationic group chemically bonded thereto, the resin being obtained by causing the polyether polyol B-1, a polymeric isocyanate, and the cationic group represented by the structural formula (6) to react with one another, and the resin serving as a binder.

In addition, the anionic salt A-1 has a cyano group-containing anion represented by the structural formula (1) as shown in Table 2 above. Therefore, an anion in the electro-conductive resin layer according to Example is the cyano group-containing anion represented by the structural formula (1).

The electro-conductive roller according to Example 1 thus obtained was evaluated for the following items. It should be noted that in the following evaluations, an environment having a temperature of 15° C. and a relative humidity of 10% was used as a low-temperature and low-humidity environment (L/L environment), and an environment having a temperature of 32.5° C. and a relative humidity of 85% was used as a high-temperature and high-humidity environment (H/H environment).

Evaluation as Electro-conductive Roller

Evaluation for Roller Resistance Value

The resistance value of the electro-conductive roller was measured in accordance with the following procedure after the roller had been left to stand in the L/L environment for 6 hours or more.

(Measurement of Initial Roller Resistance Value)

Figure 4A:
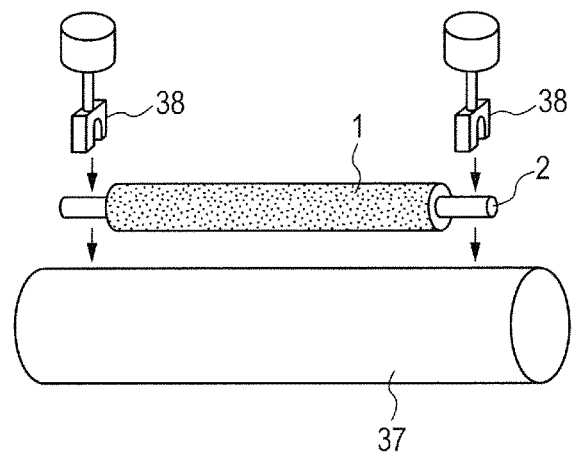
FIG. 4A is a schematic construction view for illustrating an example of such a construction that the electrophotographic member of the present invention is rotated following the rotation of a columnar metal in a measuring apparatus for measuring the current value of an electro-conductive roller as an example of the electrophotographic member.
Figure 4B:
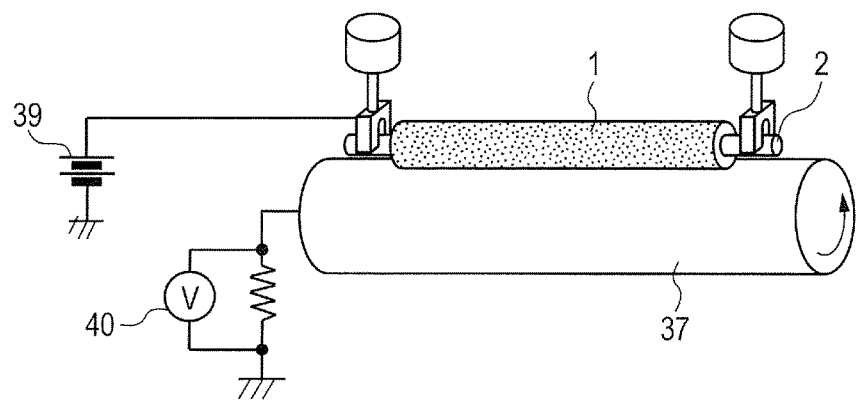
FIG. 4B is a schematic construction view for illustrating an example of the construction of the measuring apparatus for measuring the current value of the electro-conductive roller as an example of the electrophotographic member of the present invention.

Illustrated in each of FIG. 4A and FIG. 4B is a schematic construction view of a jig for evaluating a fluctuation in roller resistance value. In FIG. 4A, a columnar metal 37 having a diameter of 30 mm was rotated while both ends of an electro-conductive mandrel 2 were each pressed at a load of 4.9 N through an electro-conductive bearing 38, and an electro-conductive roller 1 was rotated following the rotation of the columnar metal at a speed of 60 rpm. Next, a voltage of 50 V was applied from a high-voltage power source 39, and a potential difference across a resistor having a known electrical resistance (the electrical resistance was two or more orders of magnitude lower than the electrical resistance of the electro-conductive roller) placed between the columnar metal 37 and the ground was measured. A voltmeter 40 (189TRUE RMS MULTIMETER manufactured by Fluke Corporation) was used in the measurement of the potential difference. A current that had flowed in the columnar metal through the electro-conductive roller 1 was determined from the measured potential difference and the electrical resistance of the resistor by calculation. The electrical resistance value of the electro-conductive roller 1 was determined by dividing the applied voltage of 50 V by the obtained current.

In the measurement of the potential difference, 2 seconds after the application of the voltage, sampling was performed for 3 seconds, and a value calculated from the average of sampled data was defined as an initial roller resistance value.

(Measurement of Roller Resistance Value after Electrification)

While the electro-conductive roller 1 was rotated for 2 hours, a current of 100 μA was flowed under the same conditions as those used in the measurement of the resistance value of the roller except that the power source illustrated in FIG. 4B was changed to a constant current source. After the electrification, a roller resistance value after the electrification was measured in the same manner as in the measurement of the initial roller resistance value.

<Triboelectric Charge Quantity of Roller>

The triboelectric charge quantity of the electro-conductive roller was measured in accordance with the following procedure after the roller had been left to stand in the H/H environment for 6 hours or more.

Figure 5:
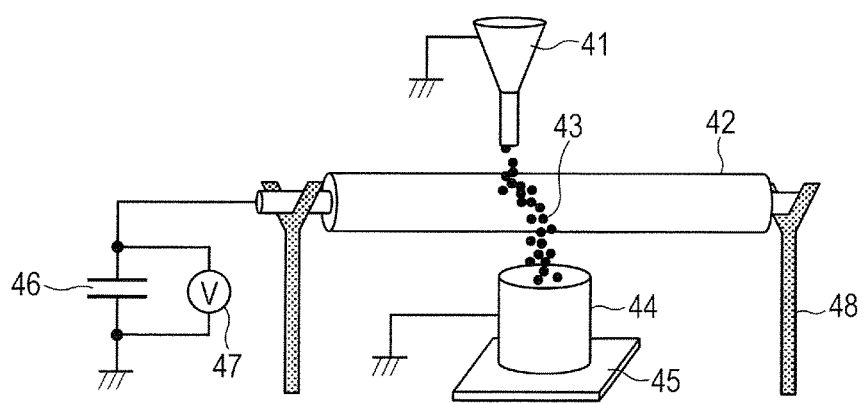
FIG. 5 is a schematic construction view of a measuring apparatus for measuring the triboelectric charge quantity of an electro-conductive roller as an example of the electrophotographic member of the present invention.

A measuring portion illustrated in FIG. 5 was connected to a cascade-type surface charge quantity-measuring apparatus TS-100AT (trade name, manufactured by Kyocera Chemical Corporation) before its use in the measurement. As illustrated in FIG. 5, an electro-conductive roller 42 was placed on insulating support rods 48, and a carrier 43 was loaded into a powder input port 41 and caused to fall for 10 seconds so that contact charging was caused to occur in the carrier 43. A standard carrier N-01 (manufactured by the Imaging Society of Japan) was used as the carrier. The total charge quantity of the carrier 43 that had fallen into a receiving dish 44 placed on an insulating plate 45 was measured with a potentiometer connected in parallel with a capacitor 46, and was defined as a charge quantity Q [μC]. Further, the mass (g) of the carrier that had fallen into the receiving dish 44 was measured, and a charge quantity per unit mass Q/M (μC/g) determined from those values was defined as an initial triboelectric charge quantity. It should be noted that the triboelectric charge quantity obtained by the electro-conductive roller in this measurement was defined as an initial triboelectric charge quantity 1.

(Triboelectric Charge Quantity of Roller after Electrification)

After the initial charge quantity of the electro-conductive roller (initial triboelectric charge quantity 1) had been measured, the same electro-conductive roller was electrified in the same manner as in the measurement of a roller resistance after electrification. After that, a triboelectric charge quantity 1 after the electrification was measured in the same manner as in the measurement of the initial triboelectric charge quantity 1.

Evaluation as Developing Roller

Evaluation for Regulation Failure

The electro-conductive roller as an evaluation object was loaded as a developing roller into a laser printer having a construction illustrated in FIG. 3 (trade name: LBP7700C; manufactured by Canon Inc.), and an evaluation for a regulation failure was performed. First, the laser printer into which the developing roller as an evaluation object had been loaded was placed in the L/L environment and then left to stand for 6 hours or more. Next, a black image having a print percentage of 1% was continuously output on a predetermined number of sheets of copier paper, and then a solid white image was output on new copier paper.

After those images had been output, the state of a toner coat on the surface of the developing roller was observed, and the presence or absence of electrostatic toner agglomeration (regulation failure) resulting from excessive charging of toner was visually observed. The result of the observation was evaluated by the following criteria. An evaluation in the case where the solid white image was output after the image having a print percentage of 1% had been output on 100 sheets was defined as an evaluation for an initial regulation failure, and an evaluation in the case where the solid white image was output after the image having a print percentage of 1% had been output on 10,000 sheets was defined as an evaluation for a regulation failure after endurance.

A: No regulation failure is present on the toner coat.
B: A regulation failure is present on the toner coat but does not appear in any image.
C: A regulation failure appears in an image.

Evaluation for Fogging Image

As in the evaluation for a regulation failure, the laser printer into which the developing roller had been loaded was placed in the H/H environment and left to stand for 6 hours or more. Next, after an image having a print percentage of 1% had been continuously output on a predetermined number of sheets of copier paper, a solid white image was output on new copier paper, and the printer was stopped during the output of the solid white image. At this time, a developer adhering onto a photosensitive member was peeled off with a tape (trade name: CT18; manufactured by Nichiban Co., Ltd.), and a reflectance was measured with a reflection densitometer (trade name: IC-6DS/A; manufactured by Tokyo Denshoku Co., Ltd.). The reduction amount (%) of the reflectance with reference to the reflectance of the tape itself was measured, and the measured value was defined as a fogging value.

A fogging value measured after the image having a print percentage of 1% had been output on 100 sheets was defined as an initial fogging value, and a fogging value measured after the image having a print percentage of 1% had been output on 10,000 sheets was defined as a fogging value after endurance.

<Triboelectric Charge Quantity of Developer>

A triboelectric charge quantity was measured for evaluating the charge-providing performance of the developing roller for the developer.

At the time of the evaluation for a fogging image, the developer carried by a portion having the narrower range out of the portions of the developing roller sandwiched between a developer-regulating blade and the position at which the developing roller abutted with the photosensitive member was sucked and collected with a metal cylindrical tube and a cylindrical filter. At that time, the quantity of charge stored in a capacitor through the metal cylindrical tube and the mass of the sucked developer were measured with a measuring machine (trade name: 8252; manufactured by ADC Corporation). A charge quantity per unit mass (μC/g) was calculated from those values. When a negatively chargeable developer is used, the sign of its charge quantity per unit mass is negative, and it can be said that as the absolute value of the charge quantity increases, the charge-providing performance of the developing roller becomes higher. The value measured in this measurement was defined as a triboelectric charge quantity 2. As in the evaluation for a fogging value, a value measured after the output on 100 sheets was defined as an initial triboelectric charge quantity 2, and a value measured after the output on 10,000 sheets was defined as a triboelectric charge quantity 2 after endurance.

Examples 2 to 15, 18, 19, 23, and 24

Electrophotographic members of Examples 2 to 15, 18, 19, 23, and 24 were each produced in the same manner as in Example 1 except that the ion conducting agent was changed as shown in Table 7.

Example 16

The following components were stirred and mixed to provide a mixture.

| | |
|---|---|
| Polyether polyol (trade name: EXCENOL 230; manufactured by Asahi Glass Co., Ltd.) | 74.6 parts by mass |
| Polyisocyanate (trade name: CORONATE 2233; manufactured by Tosoh Corporation (formerly: Nippon Polyurethane Industry Co., Ltd.)) | 63.6 parts by mass |
| Ion conducting agent I-15 | 2.0 parts by mass |
| Silica (trade name: AEROSIL 200; manufactured by Nippon Aerosil Co., Ltd.) | 10.0 parts by mass |
| Urethane resin fine particle (trade name: Art-pearl C-400; manufactured by Negami Chemical Industrial Co., Ltd.) | 10.0 parts by mass |

Then, an electro-conductive roller of Example 16 was produced in the same manner as in Example 1 by using the resultant mixture.

Examples 17 and 20

Electro-conductive rollers of Examples 17 and 20 were each produced in the same manner as in Example 16 except that the ion conducting agent was changed as shown in Table 7.

Example 21

The following components were stirred and mixed to provide a mixture.

| | |
|---|---|
| Polyester polyol (trade name: NIPPOLLAN 4010; manufactured by Tosoh Corporation (formerly: Nippon Polyurethane Industry Co., Ltd.)) | 80.0 parts by mass |

Then, an electro-conductive roller of Example 21 was produced in the same manner as in Example 1 by using the resultant mixture.

Examples 22 and 25

Electro-conductive rollers of Examples 22 and 25 were each produced in the same manner as in Example 21 except that the ion conducting agent and the compounding amount thereof were changed as shown in Table 7.

Comparative Examples 1 to 3

Electro-conductive rollers of Comparative Examples 1 to 3 were each produced in the same manner as in Example 1 except that the ion conducting agent, the polyol, and the curing agent were changed as shown in Table 7.

TABLE 7

| | | | Ion conducting agent | | | Polyol | | Curing agent | |
|---|---|---|---|---|---|---|---|---|---|
| | | No. | parts by mass | Structure of cation | Structure of anion | No. | parts by mass | No. | parts by mass |
| Example | 1 | I-1 | 2.0 | Structural formula (6) | Structural formula (1) | B-1 | 75.5 | "Millionate MR200" | 24.5 |
| | 2 | I-2 | | Structural formula (7) | Structural formula (1) | | | | |
| | 3 | I-3 | | Structural formula (8) | Structural formula (1) | | | | |
| | 4 | I-4 | | Structural formula (9) | Structural formula (1) | | | | |
| | 5 | I-5 | | Structural formula (10) | Structural formula (1) | | | | |
| | 6 | I-6 | | Structural formula (11) | Structural formula (1) | | | | |
| | 7 | A-1 | | K+ | Structural formula (1) | | | | |
| | 8 | I-7 | | Structural formula (6) | Structural formula (2) | | | | |
| | 9 | I-8 | | Structural formula (7) | Structural formula (2) | | | | |
| | 10 | I-9 | | Structural formula (8) | Structural formula (2) | | | | |
| | 11 | I-10 | | Structural formula (9) | Structural formula (2) | | | | |
| | 12 | I-11 | | Structural formula (12) | Structural formula (2) | | | | |
| | 13 | I-12 | | Structural formula (13) | Structural formula (2) | | | | |
| | 14 | I-13 | | Structural formula (7) | Structural formula (3) | | | | |
| | 15 | I-14 | | Structural formula (8) | Structural formula (3) | | | | |
| | 16 | I-15 | | Structural formula (10) | Structural formula (3) | "EXCENOL 230" | 74.6 | "CORONATE 2233" | 63.6 |
| | 17 | I-16 | | Structural formula (14) | Structural formula (3) | | | | |
| | 18 | I-17 | | Structural formula (6) | Structural formula (19) | B-1 | 75.5 | "Millionate MR200" | 24.5 |
| | 19 | I-18 | | Structural formula (9) | Structural formula (19) | | | | |
| | 20 | I-19 | | Structural formula (12) | Structural formula (19) | "EXCENOL 230" | 74.6 | "CORONATE 2233" | 63.6 |
| | 21 | I-20 | 5.0 | Li+ | Structural formula (20) | "NIPPOLLAN 4010" | 80.0 | "U-VAN 20SB" | 40.0 |
| | 22 | I-21 | 2.0 | Structural formula (14) | Structural formula (21) | | | | |
| | 23 | I-22 | 2.0 | Structural formula (6) | Structural formula (15) | B-1 | 75.5 | "Millionate MR200" | 24.5 |
| | 24 | I-23 | | Structural formula (8) | Structural formula (15) | | | | |
| | 25 | A-3 | 5.0 | Na+ | Structural formula (15) | "NIPPOLLAN 4010" | 80.0 | "U-VAN 20SB" | 40.0 |
| Comparative Example | 1 | I-24 | 2.0 | Structural formula (6) | Structural formula (16) | B-1 | 75.5 | "Millionate MR200" | 24.5 |
| | 2 | I-25 | | Structural formula (9) | Structural formula (17) | "EXCENOL 230" | 74.6 | "CORONATE 2233" | 63.6 |
| | 3 | A-6 | | Na+ | Structural formula (18) | "NIPPOLLAN 4010" | 80 | "U-VAN 20SB" | 40 |

-continued

| | |
|---|---|
| Melamine resin (trade name: U-VAN 20SB; manufactured by Mitsui Chemicals, Inc.) | 40.0 parts by mass |
| Ion conducting agent I-20 | 5.0 parts by mass |
| Silica (trade name: AEROSIL 200; manufactured by Nippon Aerosil Co., Ltd.) | 10.0 parts by mass |
| Urethane resin fine particle (trade name: Art-pearl C-800; manufactured by Negami Chemical Industrial Co., Ltd.) | 10.0 parts by mass |

The electro-conductive rollers according to Examples 2 to 25 and Comparative Examples 1 to 3 were evaluated in the same manner as in Example 1. The results of the evaluations as electro-conductive rollers are shown in Table 8, and the results of the evaluations as developing rollers are shown in Table 9. It should be noted that when a value of, for example, "1.14E+08 (Ω)" is shown in the column "roller resistance" in a table, the value means $1.14 \times 10^{08}$ (Ω).

TABLE 8

| | | Roller resistance ($\Omega$) | | Triboelectric charge quantity 1 ($\mu C/g$) | |
|---|---|---|---|---|---|
| | | Initial | After electrifycation | Initial | After electrifycation |
| Example | 1 | 1.14E+08 | 2.43E+08 | −4.2 | −4.1 |
| | 2 | 9.75E+07 | 5.71E+08 | −4.2 | −3.6 |
| | 3 | 9.94E+07 | 2.43E+08 | −4.4 | −4.1 |
| | 4 | 8.47E+07 | 5.31E+08 | −4.3 | −3.7 |
| | 5 | 2.31E+08 | 3.32E+08 | −4.1 | −4.0 |
| | 6 | 1.04E+08 | 4.37E+08 | −4.1 | −3.7 |
| | 7 | 1.34E+08 | 5.01E+08 | −4.3 | −3.7 |
| | 8 | 1.85E+08 | 2.67E+08 | −4.1 | −4.0 |
| | 9 | 1.03E+08 | 4.83E+08 | −4.0 | −3.6 |
| | 10 | 1.34E+08 | 3.39E+08 | −3.9 | −3.7 |
| | 11 | 9.81E+08 | 5.97E+08 | −4.1 | −3.5 |
| | 12 | 2.01E+08 | 3.81E+08 | −3.8 | −3.7 |
| | 13 | 2.27E+08 | 5.18E+08 | −4.1 | −3.5 |
| | 14 | 2.47E+08 | 7.34E+08 | −3.4 | −3.1 |
| | 15 | 4.37E+08 | 6.04E+08 | −3.6 | −3.5 |
| | 16 | 5.07E+08 | 6.48E+08 | −3.7 | −3.5 |
| | 17 | 5.94E+08 | 8.31E+08 | −3.4 | −3.1 |
| | 18 | 5.78E+08 | 6.19E+08 | −3.7 | −3.6 |
| | 19 | 6.18E+08 | 7.95E+08 | −3.5 | −3.3 |
| | 20 | 6.48E+08 | 7.12E+08 | −3.8 | −3.6 |
| | 21 | 6.61E+08 | 8.05E+08 | −3.3 | −2.9 |
| | 22 | 6.94E+08 | 8.64E+08 | −3.4 | −3.1 |
| | 23 | 5.98E+08 | 6.18E+08 | −3.5 | −3.4 |
| | 24 | 5.38E+08 | 6.08E+08 | −3.7 | −3.5 |
| | 25 | 6.39E+08 | 8.17E+08 | −3.4 | −3.2 |
| Comparative Example | 1 | 3.78E+08 | 4.57E+08 | −2.8 | −2.1 |
| | 2 | 9.74E+08 | 1.17E+09 | −2.2 | −1.8 |
| | 3 | 4.37E+08 | 1.23E+09 | −3.8 | −3.4 |

TABLE 9

| | | Regulation failure | | Triboelectric charge quantity 2 ($\mu C/g$) | | Fogging (%) | |
|---|---|---|---|---|---|---|---|
| | | Initial | After endurance | Initial | After endurance | Initial | After endurance |
| Example | 1 | A | A | −41 | −39 | 1.9 | 2.0 |
| | 2 | A | A | −43 | −37 | 1.8 | 2.1 |
| | 3 | A | A | −42 | −40 | 1.9 | 2.0 |
| | 4 | A | A | −42 | −36 | 1.9 | 2.1 |
| | 5 | A | A | −40 | −39 | 2.0 | 2.0 |
| | 6 | A | A | −41 | −38 | 1.9 | 2.1 |
| | 7 | A | A | −42 | −37 | 1.9 | 2.2 |
| | 8 | A | A | −40 | −39 | 2.0 | 1.9 |
| | 9 | A | A | −40 | −37 | 2.0 | 2.3 |
| | 10 | A | A | −41 | −38 | 2.0 | 2.1 |
| | 11 | A | A | −42 | −36 | 2.0 | 2.4 |
| | 12 | A | A | −39 | −38 | 2.0 | 2.1 |
| | 13 | A | A | −40 | −36 | 2.1 | 2.4 |
| | 14 | A | A | −36 | −33 | 2.3 | 3.1 |
| | 15 | A | A | −37 | −36 | 2.3 | 2.4 |
| | 16 | A | A | −37 | −35 | 2.4 | 2.6 |
| | 17 | A | B | −36 | −33 | 2.4 | 3.0 |
| | 18 | A | A | −38 | −37 | 2.3 | 2.5 |
| | 19 | A | B | −36 | −34 | 2.4 | 3.0 |
| | 20 | A | A | −37 | −35 | 2.5 | 2.7 |
| | 21 | A | B | −34 | −30 | 2.3 | 3.1 |
| | 22 | A | B | −34 | −32 | 2.4 | 3.0 |
| | 23 | A | A | −35 | −33 | 2.1 | 3.4 |
| | 24 | A | A | −36 | −34 | 2.2 | 3.3 |
| | 25 | A | B | −34 | −31 | 3.0 | 3.5 |
| Comparative Example | 1 | A | A | −32 | −28 | 2.1 | 2.5 |
| | 2 | C | C | −30 | −25 | 3.6 | 5.4 |
| | 3 | A | C | −38 | −33 | 2.3 | 5.1 |

Each of Examples showed satisfactory values in the respective measurements in a balanced manner. Of those, the ion conducting agents in Examples 1 to 13 each have an anion of a structure represented by the structural formula (1) or (2) of the present invention, and hence the initial roller resistance and the roller resistance after electrification are low. Further, values for the initial triboelectric charge quantity 1 and the triboelectric charge quantity 1 after electrification are large. In particular, in each of Examples 1, 3, 5, 8, 10, and 12 in which cations are immobilized to urethane resins, the roller resistance after electrification is kept at a low value and the triboelectric charge quantity 1 after electrification is kept at a high value.

In contrast, in each of Comparative Examples 1 and 2 that were free of an anion formed of a structure represented by any one of the structural formulae (1) to (5), the initial triboelectric charge quantity was low and the triboelectric charge quantity further reduced owing to electrification. In addition, in each of Comparative Examples 2 and 3, the roller resistance after electrification showed a high value. The anion of the ion conducting agent used in Comparative Example 3 had a plurality of nitrogen atoms, and hence the triboelectric charge quantity was able to be kept at a high value. However, the resistance of Comparative Example 3 increased owing to electrification probably because the degree of stability of the negative charge of the anion was low.

Each of Examples showed satisfactory values in the respective measurements in a balanced manner. Of those, the ion conducting agents in Examples 1 to 13 each have an anion of a structure represented by the structural formula (1) or (2), and hence no regulation failure occurs under the L/L environment and the fogging is less than 3% even under the H/H environment. In particular, in each of Examples 1, 3, 5, 8, 10, and 12 in which cations are immobilized to urethane resins, the roller resistance after endurance is kept at a low value and the triboelectric charge quantity after endurance is kept at a high value.

In contrast, in each of Comparative Examples 1 and 2 that were free of an anion formed of a structure represented by any one of the structural formulae (1) to (5) of the present invention, the initial triboelectric charge quantity was low, and the triboelectric charge quantity further reduced and the fogging increased owing to endurance. In each of Comparative Examples 2 and 3, the fogging occurred after endurance under the H/H environment. In Comparative Example 2, regulation failures occurred at an initial stage and after endurance, and in Comparative Example 3, a regulation failure occurred after endurance.

Production of Charging Roller

Example 26

Preparation of Substrate 12

A primer (trade name: DY35-051; manufactured by Dow Corning Toray Co., Ltd.) was applied to a cored bar made of SUS304 having a diameter of 6 mm, and was baked in an oven heated to a temperature of 180° C. for 20 minutes. Thus, the substrate 12 as a mandrel was obtained.

Preparation of Elastic Roller D-2

Materials shown in Table 10 were kneaded with a pressure kneader to provide an A kneaded rubber composition 1.

TABLE 10

| | |
|---|---|
| NBR rubber material (trade name: Nipol DN219; manufactured by Zeon Corporation) | 100 parts by mass |
| Carbon black (trade name: TOKABLACK #7360SB; manufactured by Tokai Carbon Co., Ltd.) | 40 parts by mass |
| Calcium carbonate (trade name: Nanox #30; manufactured by Maruo Calcium Co., Ltd.) | 20 parts by mass |
| Stearic acid (trade name: Stearic acid S; manufactured by Kao Corporation) | 1 part by mass |
| Zinc oxide | 5 parts by mass |

Further, 77 parts by mass of the A kneaded rubber composition 1 and materials shown in Table 11 were mixed with an open roll to provide an unvulcanized rubber composition 1.

TABLE 11

| | |
|---|---|
| Sulfur (trade name: Sulfax 200S; manufactured by Tsurumi Chemical Industry Co., Ltd.) | 1.2 parts by mass |
| Tetrabenzylthiuram disulfide (trade name: TBZTD; manufactured by Sanshin Chemical Industry Co., Ltd.) | 4.5 parts by mass |

An unvulcanized rubber elastic layer 2 was formed on the substrate 12 by extruding the unvulcanized rubber composition 1 from a crosshead extruder, and the curing reaction of the unvulcanized rubber elastic layer 2 was completed by heating the layer in an oven heated to a temperature of 160° C. for 70 minutes. After that, the surface of the elastic layer was polished with a rotary grindstone. Thus, an elastic roller D-2 in which a diameter at its central portion was 8.5 mm and a diameter at each of positions distant from the central portion toward both end portions by 90 mm each was 8.4 mm was obtained.

A coating film of the paint for forming a surface layer prepared in Example 1 was formed on the surface of the elastic layer of the resultant elastic roller D-2 by immersing the elastic roller D-2 in the paint, and was dried. An electro-conductive roller according to Example 26 was produced in the same manner as in Example 1 except the foregoing. It should be noted that the surface layer formed in the foregoing is an electro-conductive resin layer.

Evaluation for Roller Resistance Value

An initial roller resistance value was measured in the same manner as in the section [Evaluation for Roller Resistance Value] described in Example 1 except that the charging roller (electro-conductive roller) according to Example 26 was used and the voltage to be applied was changed to 200 V. It should be noted that the charging roller was also left to stand under the L/L environment for 6 hours or more before its use in the measurement.

(Measurement of Roller Resistance after Electrification)

A roller resistance after electrification was measured in the same manner as in the section (Measurement of Roller Resistance Value after Electrification) described in Example 1.

(Evaluations for Horizontal Streak Images in both L/L and H/H Environments)

As the resistance of a charging roller increases, fine streak-like density unevenness may occur in a halftone image. The resultant image is referred to as "horizontal streak image." The horizontal streak image tends to deteriorate as the roller resistance increases, and tends to be conspicuous in association with long-term utilization of the roller. An increase in the roller resistance may be caused by the adhesion of toner or the like to the surface of the roller as well as by electrification. In view of the foregoing, the electrophotographic member of the present invention was incorporated as a charging roller and the following evaluation was performed. The electro-conductive roller obtained in Example 26 was loaded as a charging roller into an electrophotographic laser printer (trade name: HP Color Laserjet Enterprise CP4515dn, manufactured by Hewlett-Packard Company). The laser printer into which the charging roller had been loaded was placed in the L/L or H/H environment and then left to stand for 2 hours. Next, an endurance test in which a black image having a print density of 4% (such an image that horizontal lines each having a width of 2 dots were drawn in a direction vertical to the rotation direction of a photosensitive member at an interval of 50 dots) was continuously output was performed. In addition, after the image had been output on 100 sheets or 10,000 sheets, a halftone image (such an image that horizontal lines each having a width of 1 dot were drawn in the direction vertical to the rotation direction of the photosensitive member at an interval of 2 dots) was output for an image check. The resultant image was visually observed and a horizontal streak was evaluated by the following criteria. In addition, an evaluation after the output on 100 sheets was defined as an evaluation at an initial stage, and an evaluation after the output on 10,000 sheets was defined as an evaluation after endurance.

A: The level at which no horizontal streak occurs.

B: The level at which a horizontal streak slightly occurs only in an end portion of an image.

C: The level at which a horizontal streak occurs in a substantially half region of an image and is conspicuous.

Examples 27 to 32

Electro-conductive rollers of Examples 27 to 32 were each produced in the same manner as in Example 26 except that the ion conducting agent was changed as shown in Table 12.

Comparative Examples 4 and 5

An electro-conductive roller according to Comparative Example 4 was produced in the same manner as in Example 26 except that the ion conducting agent was changed as shown in Table 12. In addition, a paint for forming a surface layer was prepared in the same manner as in Example 16 except that the ion conducting agent was changed as shown in Table 12, and an electro-conductive roller according to Comparative Example 5 was produced in the same manner as in Example 26.

TABLE 12

| | | No. | Ion conducting agent parts by mass | Structure of cation | Structure of anion | Polyol No. | Polyol parts by mass | Curing agent No. | Curing agent parts by mass |
|---|---|---|---|---|---|---|---|---|---|
| Example | 26 | I-1 | 2.0 | Structural formula (6) | Structural formula (1) | B-1 | 75.5 | "Millionate MR200" | 24.5 |
| | 27 | I-2 | | Structural formula (7) | Structural formula (1) | | | | |
| | 28 | I-3 | | Structural formula (8) | Structural formula (1) | | | | |
| | 29 | I-7 | | Structural formula (6) | Structural formula (2) | | | | |
| | 30 | I-8 | | Structural formula (7) | Structural formula (2) | | | | |
| | 31 | I-9 | | Structural formula (8) | Structural formula (2) | | | | |
| | 32 | I-15 | | Structural formula (10) | Structural formula (3) | | | | |
| Comparative Example | 4 | I-24 | 2.0 | Structural formula (6) | Structural formula (16) | B-1 | 75.5 | "Millionate MR200" | 24.5 |
| | 5 | I-26 | | Structural formula (9) | Structural formula (17) | "EXCENOL 230" | 74.6 | "CORONATE 2233" | 63.6 |

The electro-conductive rollers according to Examples 27 to 32, and Comparative Examples 4 and 5 were evaluated in the same manner as in Example 26. The results are shown in Table 13.

TABLE 13

| | | Roller resistance ($\Omega$) Initial | Roller resistance ($\Omega$) After electrification | Evaluation for horizontal streak under L/L environment Initial | Evaluation for horizontal streak under L/L environment After endurance | Evaluation for horizontal streak under H/H environment Initial | Evaluation for horizontal streak under H/H environment After endurance |
|---|---|---|---|---|---|---|---|
| Example | 26 | 2.38E+08 | 3.17E+08 | A | A | A | A |
| | 27 | 1.43E+08 | 6.78E+08 | A | A | A | A |
| | 28 | 1.73E+08 | 2.97E+08 | A | A | A | A |
| | 29 | 3.38E+08 | 5.46E+08 | A | A | A | A |
| | 30 | 4.15E+08 | 6.17E+08 | A | A | A | A |
| | 31 | 1.83E+08 | 3.11E+08 | A | A | A | A |
| | 32 | 4.13E+08 | 6.57E+08 | A | A | A | A |
| Comparative Example | 4 | 6.38E+08 | 8.17E+08 | A | B | A | C |
| | 5 | 8.37E+08 | 1.18E+09 | C | C | C | C |

In each of Examples, satisfactory image quality is obtained. In each of Examples 26 to 31 out of those examples, the surface layer contains an ion conducting agent formed of a cation and an anion represented by the structural formula (1) or (2), and hence the increase in resistance is small even under the low-temperature and low-humidity environment, and the image quality is satisfactory under both the high-temperature and high-humidity environment, and the low-temperature and low-humidity environment. In particular, in each of Examples 26, 28, 29, and 31 in which cations are immobilized to urethane resins, the increase in resistance has been suppressed at an additionally high level.

In contrast, in Comparative Example 4 that contained a cation but was free of an anion represented by any one of the structural formulae (1) to (5), the occurrence of a horizontal streak was observed under the high-temperature and high-humidity environment. It is probably because under the high-temperature and high-humidity environment, triboelectric chargeability reduced to facilitate the adhesion of toner or the like that the horizontal streak occurred. In addition, in Comparative Example 5, under each of the low-temperature and low-humidity environment, and the high-temperature and high-humidity environment, the increase in resistance was observed and the occurrence of a conspicuous horizontal streak was observed.

Evaluation as Developing Blade

Example 33

A SUS sheet having a thickness of 0.08 mm (manufactured by Nisshin Steel Co., Ltd.) was subjected to press cutting into a supporting substrate (substrate) having the following dimensions: a length of 200 mm and a width of 23 mm. Next, a coating film of the paint for forming a surface layer of Example 1 was formed by immersing a portion distant from a longer side end portion of the cut SUS sheet by up to 1.5 mm in the paint, and was dried. A resin layer (electro-conductive resin layer) having a thickness of 15 μm was formed on the surface of the longer side end portion of the SUS sheet by further subjecting the coating film to a heat treatment at a temperature of 80° C. for 1 hour. Thus, a developing blade according to Example 33 was produced.

Evaluation for Regulation Failure

An evaluation for a regulation failure was performed in the same manner as in the section <Evaluation for Regulation Failure> described in Example 1 except that the developing blade according to this example was loaded while the following point was kept unchanged: the developing roller of the laser beam printer was changed to the developing roller according to the present invention.

Evaluation for Fogging Image

An evaluation for a fogging image was performed in the same manner as in the section <Evaluation for Fogging Image> described in Example 1 except that the developing blade according to this example was loaded while the following point was kept unchanged: the developing roller of the laser beam printer was changed to the developing roller according to the present invention.

Examples 34 to 39

Developing blades of Examples 34 to 39 were each produced in the same manner as in Example 33 except that the ion conducting agent was changed as shown in Table 14.

Comparative Examples 6 and 7

A developing blade according to Comparative Example 6 was produced in the same manner as in Example 33 except that the ion conducting agent was changed as shown in Table 14. In addition, a paint for forming a surface layer was prepared in the same manner as in Example 16 except that the ion conducting agent was changed as shown in Table 14, and a developing blade according to Comparative Example 7 was produced in the same manner as in Example 33.

The developing blades according to Examples 34 to 39, and Comparative Examples 6 and 7 were evaluated in the same manner as in Example 33. The results are shown in Table 15.

TABLE 15

|  |  | Evaluation for regulation failure | | Fogging (%) | |
|---|---|---|---|---|---|
|  |  | Initial | After endurance | Initial | After endurance |
| Example | 33 | A | A | 1.8 | 2.0 |
|  | 34 | A | A | 1.9 | 2.1 |
|  | 35 | A | A | 1.9 | 2.0 |
|  | 36 | A | A | 2.0 | 2.0 |
|  | 37 | A | A | 1.9 | 2.2 |
|  | 38 | A | A | 2.0 | 2.1 |
|  | 39 | A | A | 2.3 | 2.4 |
| Comparative Example | 6 | A | B | 3.5 | 5.1 |
|  | 7 | C | C | 3.7 | 5.4 |

The ion conducting agents used in Examples 33 to 39 each have an anion of a structure represented by any one of the structural formulae (1) to (3), and hence no regulation failure occurs under the L/L environment and the fogging is less than 3% even under the H/H environment.

In contrast, in each of Comparative Examples 6 and 7, the regulation failure or the fogging occurred. The regulation failure under the L/L environment occurred probably as a result of the following: the resistance of the blade increased, a blade bias to be applied did not reach a specified value, and hence the charging of toner became nonuniform. The fogging occurred probably because as in a developing roller, charge-providing performance reduced and hence the toner could not be charged to a predetermined charge quantity.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-102899, filed May 16, 2014, which is hereby incorporated by reference herein in its entirety.

TABLE 14

|  |  | Ion conducting agent | | | Polyol | | Curing agent | |
|---|---|---|---|---|---|---|---|---|
|  | No. | parts by mass | Structure of cation | Structure of anion | No. | parts by mass | No. | parts by mass |
| Example | 33 I-1 | 2.0 | Structural formula (6) | Structural formula (1) | B-1 | 75.5 | "Millionate MR200" | 24.5 |
|  | 34 I-2 |  | Structural formula (7) | Structural formula (1) |  |  |  |  |
|  | 35 I-3 |  | Structural formula (8) | Structural formula (1) |  |  |  |  |
|  | 36 I-7 |  | Structural formula (6) | Structural formula (2) |  |  |  |  |
|  | 37 I-8 |  | Structural formula (7) | Structural formula (2) |  |  |  |  |
|  | 38 I-9 |  | Structural formula (8) | Structural formula (2) |  |  |  |  |
|  | 39 I-15 |  | Structural formula (10) | Structural formula (3) |  |  |  |  |
| Comparative Example | 6 I-24 | 2.0 | Structural formula (6) | Structural formula (16) | B-1 | 75.5 | "Millionate MR200" | 24.5 |
|  | 7 I-26 |  | Structural formula (9) | Structural formula (17) | "EXCENOL 230" | 74.6 | "CORONATE 2233" | 63.6 |

What is claimed is:

1. An electrophotographic member, comprising:
an electro-conductive substrate; and
an electro-conductive resin layer, the electro-conductive resin layer containing an ion conducting agent consisting of a cation and an anion according to formula (5), the cation being a binder resin of the electro-conductive resin layer, wherein a cationic group is bound to the binder resin $$(CN)_n X_{3-n} CSO_3^- \quad (5)$$

where X represents a halogen atom and n represents an integer of 2 or 3.

2. A process cartridge, which is removably mounted onto a main body of an electrophotographic apparatus, the process cartridge comprising at least one of a charging member, a developer carrying member, and a developer layer thickness regulating member, wherein
at least one of the charging member, the developer carrying member, and the developer layer thickness regulating member comprises the electrophotographic member of claim 1.

3. An electrophotographic apparatus, comprising:
an electrophotographic photosensitive member; and
at least one of a charging member, a developer carrying member, and a developer layer thickness regulating member, wherein
at least one of the charging member, the developer carrying member, and the developer layer thickness regulating member comprises the electrophotographic member of claim 1.

4. The electrophotographic member according to claim 1, wherein the cation is a monovalent cation compound containing a monovalent phosphonium group or a monovalent nitrogen containing heterocyclic group.

5. The electrophotographic member according to claim 4, wherein the monovalent cationic group is at least one member selected from the group consisting of formulae (6), (7), (10), (11), (12) and (14):

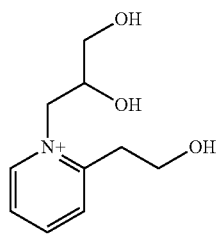

Structural formula (6)

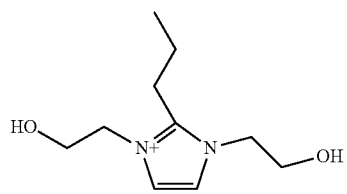

Structural formula (7)

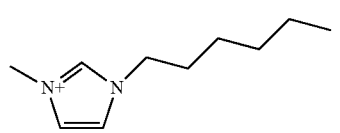

Structural formula (10)

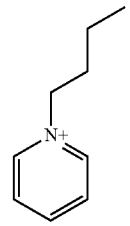

Structural formula (11)

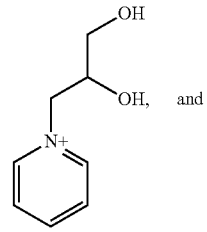

Structural formula (12), and

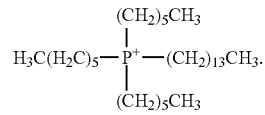

Structural formula (14)

6. The electrophotographic member according to claim 1, wherein the binder resin has a structure derived from a monovalent cationic compound containing a monovalent phosphonium group or a monovalent nitrogen containing heterocyclic group.

7. The electrophotographic member according to claim 6, wherein the monovalent cationic group is at least one member selected from the group consisting of formulae (6), (7), (10), (11), (12) and (14):

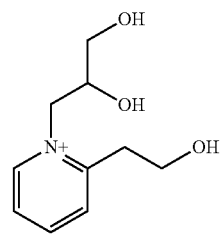

Structural formula (6)

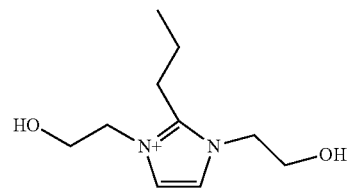

Structural formula (7)

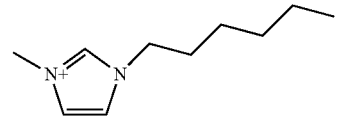

Structural formula (10)

Structural formula (11)

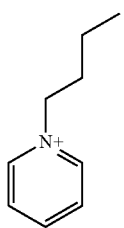

Structural formula (12)

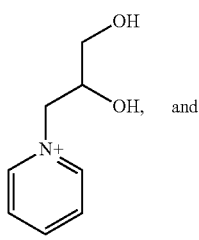 and

Structural formula (14)

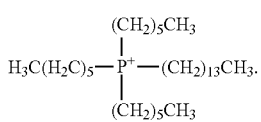

8. An electrophotographic member, comprising:

an electro-conductive substrate; and an electro-conductive resin layer, wherein the electro-conductive resin layer contains a resin, a cation and an anion according to formula (5):

$$(CN)_n X_{3-n} CSO_3^-  \qquad (5)$$

where X represents a halogen atom and n represents an integer of 2 or 3.

* * * * *